(12) United States Patent
Ueki et al.

(10) Patent No.: US 8,280,118 B2
(45) Date of Patent: Oct. 2, 2012

(54) BIOMETRICS AUTHENTICATION DEVICE AND PORTABLE TERMINAL

(75) Inventors: Hironori Ueki, Hachioji (JP); Yasutaka Konno, Saitama (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 12/439,552

(22) PCT Filed: Nov. 21, 2006

(86) PCT No.: PCT/JP2006/323634
§ 371 (c)(1),
(2), (4) Date: Mar. 2, 2009

(87) PCT Pub. No.: WO2008/062544
PCT Pub. Date: May 29, 2008

(65) Prior Publication Data
US 2010/0008545 A1    Jan. 14, 2010

(51) Int. Cl.
*G06K 9/00* (2006.01)
(52) U.S. Cl. ........................................................ 382/115
(58) Field of Classification Search ................. None
See application file for complete search history.

(56) References Cited

U.S. PATENT DOCUMENTS

| 2006/0119369 A1 | 6/2006 | Kawahata et al. |
| 2008/0075330 A1 | 3/2008 | Matsumura et al. |

FOREIGN PATENT DOCUMENTS

| JP | 7-21373 A | 1/1995 |
| JP | 2005-346238 A | 12/2005 |
| JP | 2006-11711 A | 1/2006 |
| JP | 2006-162345 A | 6/2006 |
| JP | 2006-259829 A | 9/2006 |
| JP | 2006-305154 A | 11/2006 |
| WO | 2006/038276 A1 | 4/2006 |

*Primary Examiner* — Chan S Park
*Assistant Examiner* — Elisa Rice
(74) *Attorney, Agent, or Firm* — Mattingly & Malur, P.C.

(57) ABSTRACT

Provided is a biometric authentication device for identifying an individual based on a biometric pattern of the subject included in a picked up image. The biometric authentication device includes: a light guiding unit for outputting light from a surface thereof; a liquid crystal display (LCD) unit for adjusting, on a display pixel basis, an intensity of light output from the surface of the light guiding unit; an image pickup unit for picking up an image of the subject; a display light source for emitting light used as a backlight of the LCD unit; a detection light source for emitting light for irradiating the subject; and a control unit for controlling processing of the biometric authentication device The control unit turns on the detection light when the image pickup unit picks up a first image, which is used for authentication, and turns on the display light source when the LCD unit displays information.

9 Claims, 20 Drawing Sheets

BIOMETRICS AUTHENTICATION DEVICE AND PORTABLE TERMINAL

TECHNICAL FIELD

This invention relates to a biometric authentication device which utilizes features of biometric information to identify individuals, and more particularly, to a technology of identifying an individual based on a blood vessel pattern.

BACKGROUND ART

Biometric authentication in which features of biometric information are used to identify individuals has lately been attracting attention. Examples of biometric information include fingerprints and iris or blood vessel patterns.

Advantages of biometric authentication are convenience and high security, which are owing to the fact that biometric authentication does not require a person to carry a key with him/her and has less fear of fraudulent acts as a consequence of the loss or theft of the key, or the like.

Of the varying types of biometric authentication, authentication using blood vessel patterns (blood vessel authentication) is becoming popular. Blood vessel patterns which are information within a living body are more difficult to counterfeit than fingerprints. The security of blood vessel authentication is accordingly higher than that of fingerprint authentication. Further, in blood vessel authentication an eyeball does not need to be irradiated with light, unlike iris authentication, which helps users to feel less reluctant to use blood vessel authentication and makes blood vessel authentication safe to human health.

An example of a blood vessel authentication device is disclosed in JP 07-21373 A. The blood vessel authentication device irradiates a human body with near-infrared light. Using an image sensor, the blood vessel authentication device takes a photograph with transmitted light and reflected light. Hemoglobin in blood absorbs near-infrared light more than the rest of the body does, and hence a blood vessel pattern is extracted in the picked up image. The blood vessel authentication device determines whether or not the blood vessel pattern extracted in the picked up image matches any blood vessel pattern registered in advance. Based on the result of the blood vessel pattern matching, the blood vessel authentication device identifies an individual.

In the case where a biometric authentication device is mounted to a portable electronic device such as a cellular phone, it is difficult to secure enough space to mount a biometric authentication device in the portable electronic device. Reduction in size of biometric authentication devices is therefore necessary.

For instance, a normal fingerprint authentication device includes a contact detection type optical image sensor, a pressure-sensitive sensor, or the like as a sensor for measuring a fingerprint pattern. These sensors have approximately the same size as the size of a human fingertip, and are difficult to mount in a mobile electronic device. As a solution, a fingerprint authentication device equipped with a small line sensor has been developed. This fingerprint authentication device photographs a finger sliding over the small line sensor. A problem of the fingerprint authentication device is consequently the poor quality of the obtained fingerprint image.

Blood vessel authentication devices, on the other hand, include an image sensor such as a charge coupled device (CCD) sensor or a complementary metal-oxide semiconductor (CMOS) sensor. These image sensors can be reduced in size, but a separate lens is necessary for forming an image on the image sensor. Reducing the overall size of a blood vessel authentication device is therefore not easy.

JP 2005-346238 A discloses a fingerprint authentication device including a translucent image sensor overlaid on a liquid crystal display. With this structure, an image sensor can be disposed over a liquid crystal display of a cellular phone and therefore does not require a space dedicated to the image sensor. Further, a backlight for the liquid crystal display can be utilized, without any modifications, as an irradiation light source for photographing.

Known technologies are employable in manufacturing the translucent image sensor. According to the known technologies, a sensor array is formed by laminating an amorphous silicon layer or a polysilicon layer on a glass substrate.

DISCLOSURE OF THE INVENTION

Applying the technology disclosed in JP 2005-346238 A to a blood vessel authentication device raises the following problems:

Firstly, in blood vessel authentication devices where infrared light is used as irradiation light, the backlight of a liquid crystal display cannot be used as the irradiation light source. Blood vessel authentication devices therefore need to include a separate infrared light source on the periphery of the liquid crystal display. Then, the problem of insufficient intensity of light arises in a central part of the liquid crystal display which is distant from the infrared light source.

Secondly, in blood vessel authentication devices, the relative positional relation between the light source and a subject is easily changed depending on where the subject is placed. This leads to the problem of unstable intensity of light distribution in a picked up image.

Further, even if a liquid crystal backlight is somehow made usable as the irradiation light source, blood vessel authentication devices undesirably allow scattered light that is generated when irradiation light is transmitted through the substrate of the translucent sensor to intrude in a picked up image. The quantum noise of scattered light causes lowering in contrast-to-noise ratio of a picked up image and accordingly degrades the image quality of the picked up image.

The effect of image quality degradation due to the quantum noise of scattered light is particularly large in blood vessel authentication devices where the intensity of signal light that is output from the living body is very low compared with that of the irradiation light.

Those various problems mentioned above lower the authentication accuracy of a biometric authentication device. An object of a representative mode of this invention is therefore to provide a biometric authentication device that has high authentication accuracy.

According to the representative mode of this invention, a biometric authentication device for identifying an individual who is associated with a subject based on a biometric pattern of the subject which is included in a picked up image, includes: a light guiding unit for outputting, from a surface thereof, light incident on an end face thereof; a liquid crystal display unit for adjusting, on a display pixel basis, an intensity of light output from the surface of the light guiding unit, and then outputting the light in a direction of the subject; an image pickup unit for picking up an image of the subject; a display light source for emitting light used as a backlight of the liquid crystal display unit such that the light is incident on the end face of the light guiding unit; a detection light source for emitting light for irradiating the subject such that the light is incident on the end face of the light guiding unit; and a control unit for controlling processing of the biometric authentication device, in which: the control unit turns on the detection light when the image pickup unit picks up a first image, which is used for authentication; and the control unit turns on the display light source when the liquid crystal display device displays information.

According to the representative mode of this invention, the biometric authentication device can be enhanced in authentication accuracy.

BEST MODE FOR CARRYING OUT THE INVENTION

Embodiments of this invention will be described below with reference to the drawings.

First Embodiment

Figure 1:
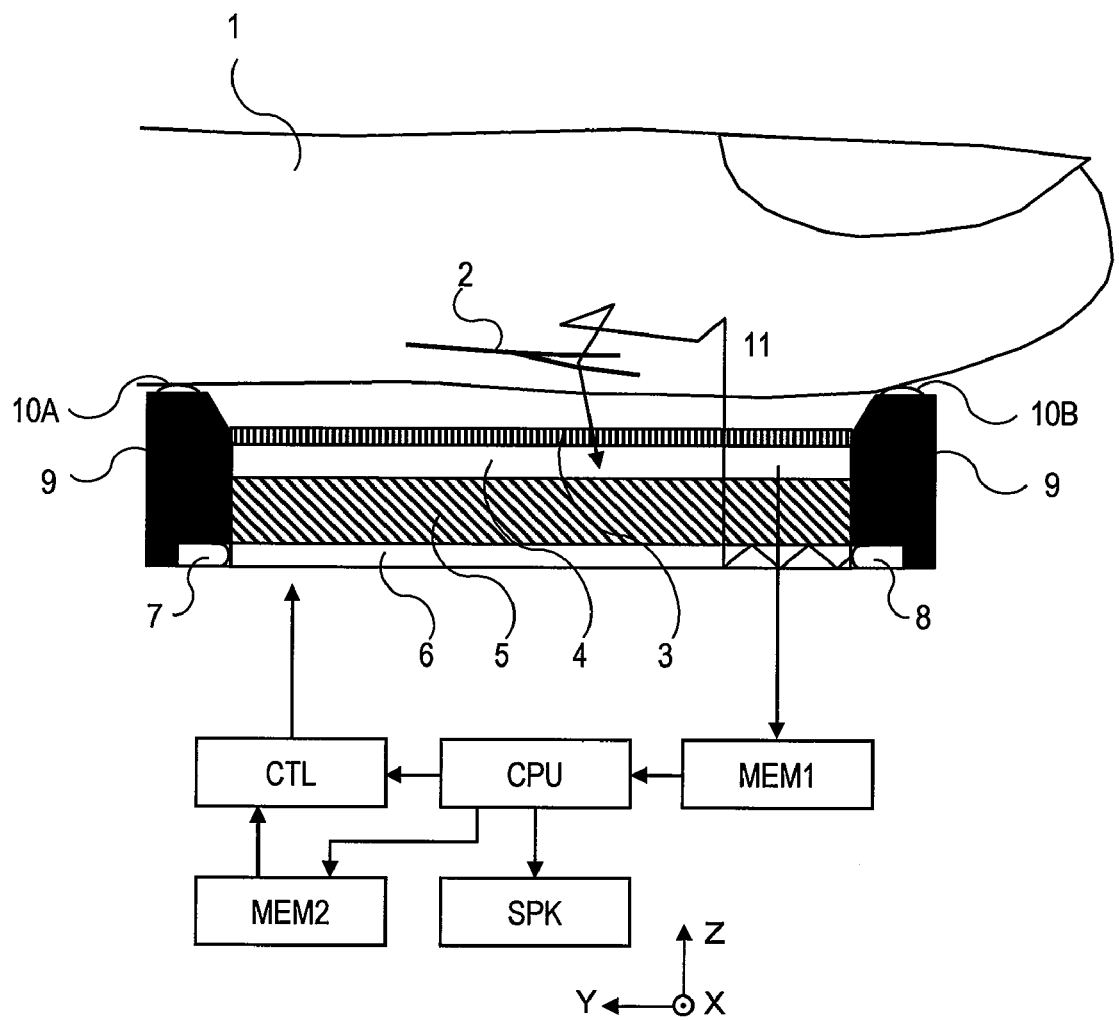
FIG. 1 is a structural diagram of a biometric authentication device in accordance with a first embodiment of this invention.

FIG. 1 is a structural diagram of a biometric authentication device according to a first embodiment of this invention.

The biometric authentication device performs authentication based on the pattern of blood vessels 2 of a subject 1. The subject 1 is a human finger in this embodiment, but may be other body parts than a finger as long as the pattern of the blood vessels 2 can be photographed. Examples of other body parts than a finger include the palm of a hand and the back of a hand.

In this embodiment, the width direction of the subject 1 is an X axis, the longitudinal direction of the subject 1 is a Y axis, and a direction perpendicular to an input face of the biometric authentication device is a Z axis.

The biometric authentication device includes a grid 3, a sensor board 4, a liquid crystal display board 5, an optical waveguide 6, a display light emission diode (LED) 7, a detection LED 8, a support frame 9, electrodes 10A and 10B, a shooting control device CTL, a detected image memory MEM1, a display image memory MEM2, a central processing unit CPU, and a speaker SPK.

The biometric authentication device can be mounted on another device such as a cellular phone. In this case, parts of the device on which the biometric authentication device is mounted may be used as some or all of the detected image memory MEM1, the display image memory MEM2, the central processing unit CPU, and the speaker SPK.

The display LED 7, which is placed on the root side of the subject 1 in this explanatory diagram, may be set on the tip side of the subject 1. The detection LED 8, which is placed on the tip side of the subject 1 in this explanatory diagram, may be set on the root side of the subject 1. The display LED 7 and the detection LED 8 are fixed by the support frame 9. The placement of the display LED 7 and the detection LED 8 is described in detail with reference to FIGS. 13, 14, and 15.

The optical waveguide 6, the liquid crystal display board 5, the sensor board 4, and the grid 3 are overlaid in the Z axis direction in the stated order. The optical waveguide 6, the liquid crystal display board 5, the sensor board 4, and the grid 3 are fixed by the support frame 9.

A top face of the support frame 9 is positioned to be on a higher level than a top face of the grid 3. This way, a pressure to the blood vessels 2 from the contact between the subject 1 and the grid 3 is prevented as much as possible, whereby an image containing a clear pattern of the blood vessels 2 is picked up. The electrodes 10A and 10B are placed on the top face of the support frame 9.

Functions of the components constituting the biometric authentication device are described next.

The display LED 7 is a known LED light source and emits white light. The display LED 7 is used as a backlight when the liquid crystal display board 5 displays various types of information. The display LED 7 may also be used for irradiation light with which a subject is irradiated.

The detection LED 8 is a known LED light source and emits infrared light. The detection LED 8 is therefore used to emit irradiation light with which a subject is irradiated in biometric authentication. When the display LED 7 and the detection LED 8 are to emit irradiation light will be described later with reference to FIGS. 7, 11, and 12.

The optical waveguide 6 diffuses light emitted from the display LED 7 or the detection LED 8 in an X-Y plane direction in a uniform manner to output diffused light in the Z axis direction. The optical waveguide 6 is a known optical waveguide that is employed in liquid crystal displays and the like.

The liquid crystal display board 5 includes a thin film transistor (TFT) drive substrate, a polarizing filter, a transparent electrode, a liquid crystal layer, a color filter, and others. The color filter employed is a type that is transmissive of infrared light emitted from the detection LED 8, in addition to being transmissive of light of R, G, and B colors. In the liquid crystal display board 5, the intensity of transmitted light of the liquid crystal layer is controlled on a display pixel basis by controlling a voltage applied to the liquid crystal layer. The liquid crystal display board 5 employed is a known liquid crystal display board which has a plurality of display pixels.

The liquid crystal display board 5 has a mask function, a light adjustment function, and a display function. The mask function is for controlling a region that transmits infrared light output from the optical waveguide 6 (irradiation region) and a region that does not transmit infrared light output from the optical waveguide 6 (mask region). The light adjustment function is for adjusting the intensity of infrared light that is transmitted after output from the optical waveguide 6. The display function is for displaying various types of information including text and images.

The sensor board 4 is a translucent substrate and transmits light such that part of light entering from a bottom face of the sensor board 4 exits a top face of the sensor board 4. The sensor board 4 picks up an image by detecting only light that enters from the top face. For example, a known photodiode array that is formed by laminating amorphous silicon on a glass substrate is used as the sensor board 4. Details of the structure of the sensor board 4 will be described later with reference to FIGS. 16 and 17.

The grid 3 has many minute grid cells formed inside, which enables the grid 3 to block incident light that is oblique with respect to the plane of the board of the grid 3. For example, a known lattice grid for use in an anti-peep filter (privacy filter) is employed as the grid 3.

The grid 3 controls the incident angle range of light that is incident on the subject 1. The grid 3 thus prevents the light irradiation region which is controlled by the mask function of the liquid crystal display board 5 from expanding.

The grid 3 also controls the output angle of light output from the subject 1. An image containing the pattern of the blood vessels 2 is thus formed on the sensor board 4. Further, the grid 3 prevents scattered light from degrading the image quality.

The electrodes 10A and 10B are used to detect that the subject 1 is put on the biometric authentication device. Specifically, a power source (omitted from the drawing) provides a slight electric potential difference between the electrode 10A and the electrode 10B. At the moment when the subject 1 is put in place, a current flows between the electrode 10A and the electrode 10B via the subject 1. The biometric authentication device detects that the subject 1 has been put in place by measuring a current that flows between the electrodes 10A and 10B.

The shooting control device CTL controls the turning on/off of the display LED 7 and the detection LED 8 following instructions from the central processing unit CPU. The shooting control device CTL reads image data recorded in the display image memory MEM2, and displays the read image data on the liquid crystal display board 5. The shooting control device CTL also controls the picking up of an image by the sensor board 4.

The detected image memory MEM1 records an image picked up by the sensor board 4.

The central processing unit CPU performs various types of processing. For example, from an image recorded in the detected image memory MEM1, the central processing unit CPU creates an image to be displayed on the liquid crystal display board 5 by a method described later with reference to FIG. 11. The central processing unit CPU next records the created image in the display image memory MEM2.

The central processing unit CPU also executes biometric authentication of the subject 1 based on an image that is recorded in the detected image memory MEM1. For example, the central processing unit CPU uses a technology disclosed in JP 07-21373 A to execute biometric authentication of the subject 1.

The result of biometric authentication executed by the central processing unit CPU is output from at least one of the liquid crystal display board 5 and the speaker SPK. The biometric authentication device thus notifies a user of the result of biometric authentication.

Described next is a path of infrared light 11 with which an image containing the pattern of the blood vessels 2 is formed.

The infrared light 11 emitted from the detection LED 8 is first scattered inside the optical waveguide 6 and output in a direction toward a top face of the optical waveguide 6. The infrared light 11 is next transmitted through the liquid crystal display board 5, the sensor board 4, and the grid 3, and then enters the subject 1. The infrared light 11 is scattered inside the subject 1 and transmitted through the blood vessels 2. Thereafter, the infrared light 11 is output from the subject 1. The infrared light 11 is next transmitted through the grid 3 and then enters the sensor board 4, which detects the infrared light 11 upon incidence.

Part of the infrared light 11 is blocked by the mask function or light adjustment function of the liquid crystal display board 5. When transmitted through the sensor board 4, the infrared light 11 is partially blocked or scattered. The infrared light 11 that enters obliquely with respect to the plane of the board of the grid 3 is blocked by the grid 3.

Figure 2:
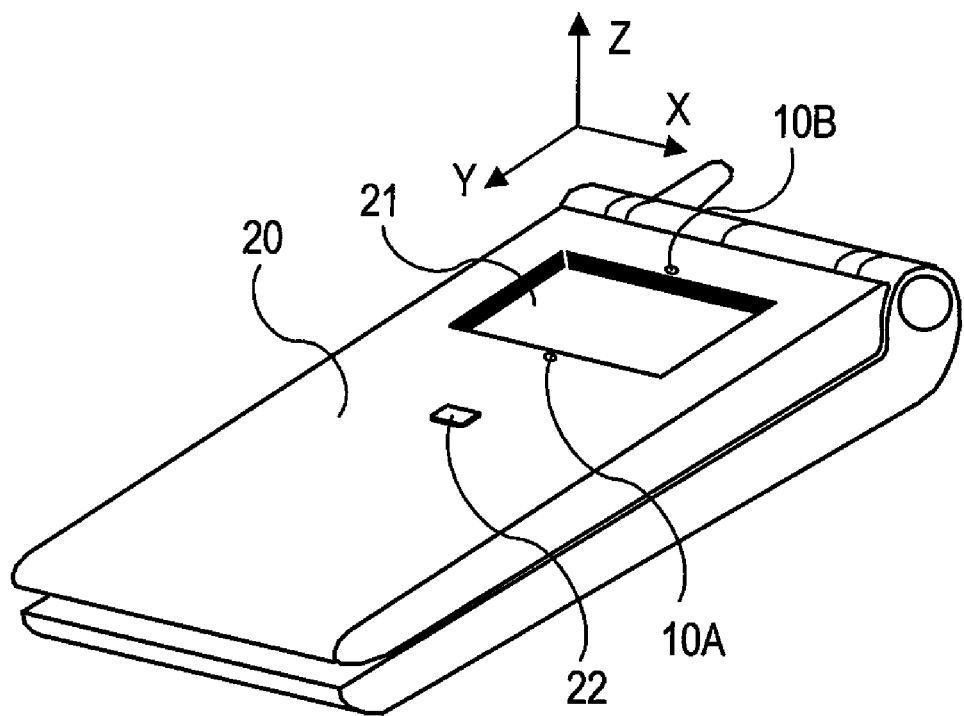
FIG. 2 is an explanatory diagram of an external appearance of a cellular phone on which a biometric authentication device is installed in accordance with the first embodiment of this invention.

FIG. 2 is an explanatory diagram of the external appearance of a cellular phone 20 on which a biometric authentication device 21 is installed according to the first embodiment of this invention.

The cellular phone 20 is of a folding type, and includes a main display and a sub-display. The cellular phone 20 may not be foldable and may instead be one piece. The biometric authentication device 21 in this explanatory diagram uses the sub-display of the cellular phone 20, but may use the main display.

A start switch 22 and the electrodes 10A and 10B are disposed in an outer casing of the cellular phone 20.

The electrodes 10A and 10B are used to detect that the subject 1 is put on the biometric authentication device 21. The electrodes 10A and 10B are therefore located around the sub-display of the cellular phone 20. The start switch 22 receives an instruction to start biometric authentication from a user.

Figure 3:
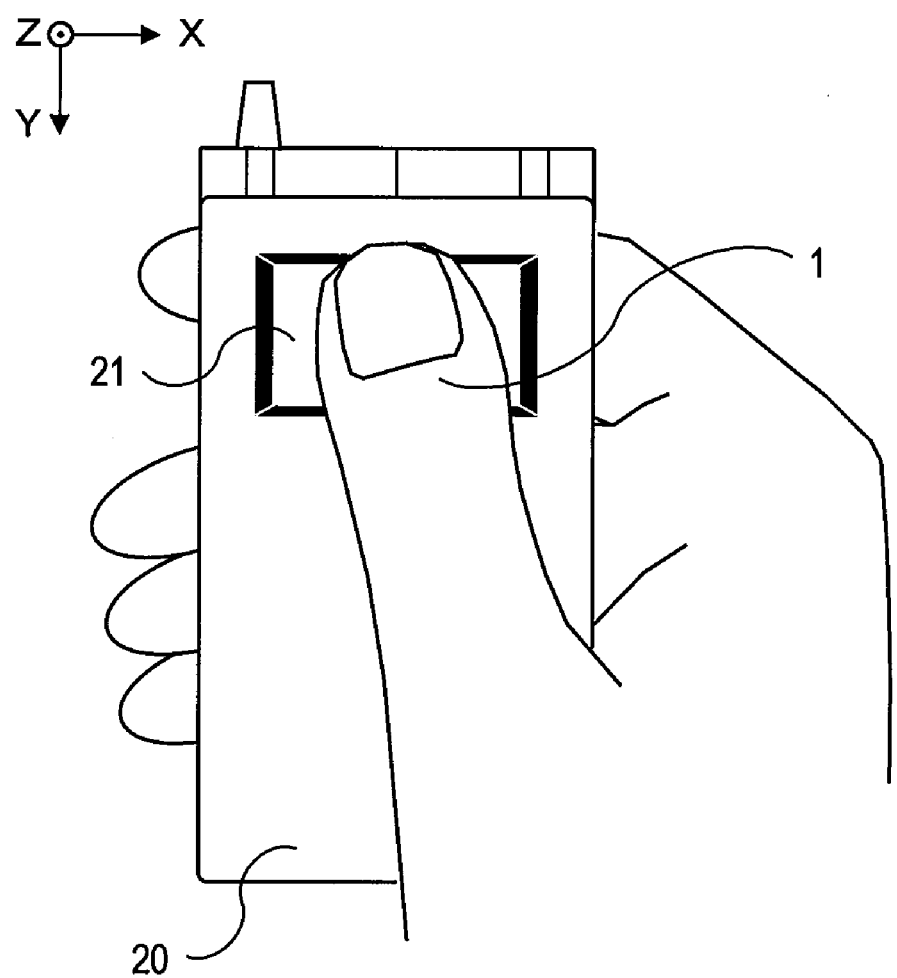
FIG. 3 is an explanatory diagram of placement of a subject put on the biometric authentication device in accordance with the first embodiment of this invention.

FIG. 3 is an explanatory diagram of how the subject 1 is put on the biometric authentication device 21 according to the first embodiment of this invention.

A user places the subject 1 such that the subject 1 comes into contact with the two electrodes 10A and 10B simultaneously. However, the placement location of the subject 1 varies each time authentication is executed. The biometric authentication device 21 of this embodiment is capable of picking up an image that contains a clear pattern of the blood vessels 2 irrespective of how the subject 1 is placed.

This embodiment takes as an example a case in which the subject 1 is the thumb of the right hand, but the subject 1 may be other fingers of the right hand or a finger of the left hand.

Figure 4:
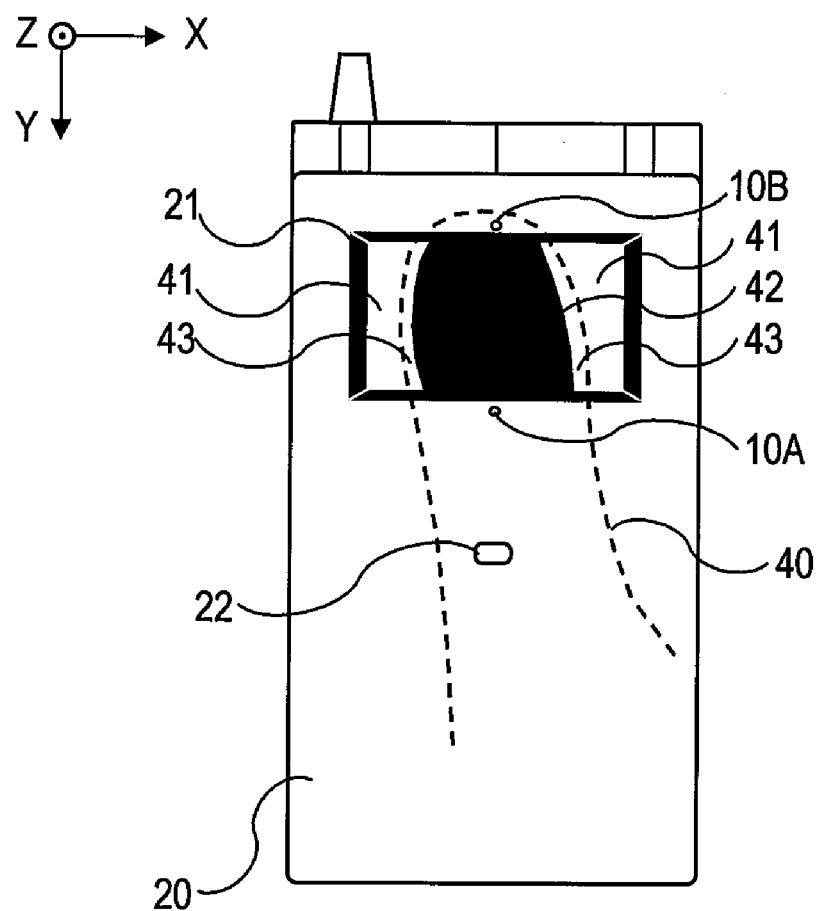
FIG. 4 is an explanatory diagram of a mask image which is displayed on the biometric authentication device when the subject is photographed in accordance with the first embodiment of this invention.

FIG. 4 is an explanatory diagram of a mask image which is displayed on the biometric authentication device 21 when the subject 1 is photographed according to the first embodiment of this invention.

When photographing the subject 1, the biometric authentication device 21 creates a mask image based on the shape and placement location of the subject 1. The biometric authentication device 21 then displays the created mask image.

The mask image contains a mask region 42 and an irradiation region 41. The mask region 42 is a region that is displayed black by the liquid crystal on the display screen. In other words, the mask region 42 is a region in which infrared light output from the optical waveguide 6 is not transmitted and accordingly the subject 1 is not irradiated with light. The irradiation region 41, on the other hand, is a region in which the subject 1 is irradiated with light, and corresponds to other regions than the mask region 42.

The mask region 42 is a region slightly inside an outline 40 of the subject 1 viewed from the Z axis direction.

In the mask region 42, infrared light output from the optical waveguide 6 is blocked by cells displaying black of liquid crystal. The infrared light output from the optical waveguide 6 therefore irradiates the subject 1 only in an outline region 43 out of the irradiation region 41. The outline region 43 is a gap between a region inside the outline of the subject 1 and the mask region 42.

In this way, the biometric authentication device 21 irradiates the subject 1 with always the same infrared rays regardless of a change in how the subject 1 is put on the biometric authentication device 21. The biometric authentication device 21 can thus pick up an image containing a clear pattern of the blood vessels 2 stably.

Figure 5:
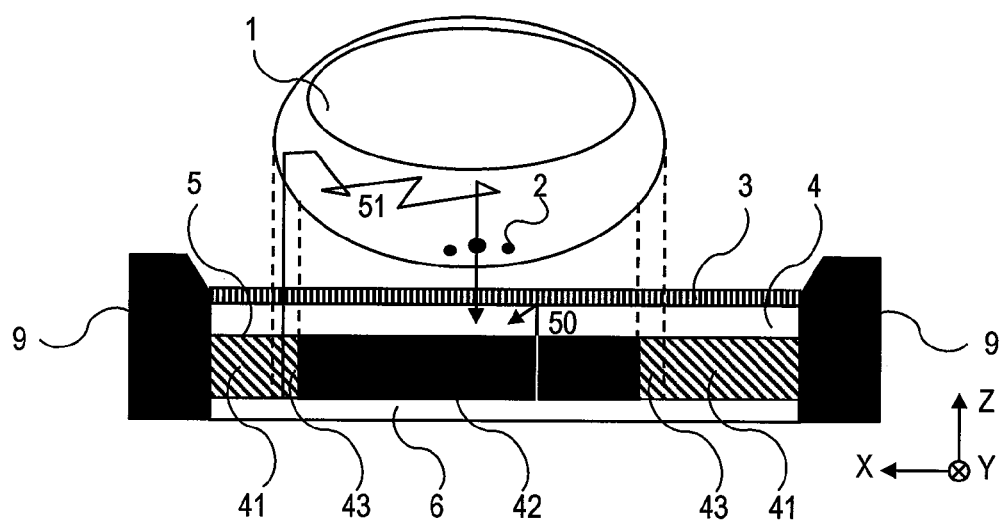
FIG. 5 is a sectional view of the biometric authentication device in accordance with the first embodiment of this invention.

FIG. 5 is a sectional view of the biometric authentication device 21 according to the first embodiment of this invention.

The biometric authentication device 21 of FIG. 5 is displaying a mask image containing the irradiation region 41 and the mask region 42. The irradiation region 41 contains the outline region 43.

Of infrared light output from the optical waveguide 6, infrared light that is output from below the mask region 42 is blocked by liquid crystal molecules aligned to display black, and therefore does not enter the subject 1.

If infrared light is transmitted in the mask region 42, part of infrared light output from the optical waveguide 6 is scattered by protective glass (omitted from the drawing) disposed on a top face of the sensor board 4 or by a bottom face of the grid 3. Scattered light such as this enters the sensor board 4 and degrades the image quality of the picked up image. For instance, scattered light narrows the dynamic range of the sensor board 4. Moreover, the quantum noise of scattered light causes lowering in the contrast-to-noise ratio of a picked up image.

The biometric authentication device 21 of this embodiment prevents image quality degradation due to scattered light by displaying a mask image.

Of infrared light output from the optical waveguide 6, infrared light that is output from below the outline region 43 is transmitted through the liquid crystal display board 5 and enters the subject 1, thereby contributing to the formation of an image that contains the pattern of the blood vessels 2. The biometric authentication device 21 adjusts the intensity of light with which the subject 1 is irradiated to an appropriate value. For that purpose, the biometric authentication device 21 adjusts the liquid crystal gray scale of the irradiation region 41 by a method described later with reference to FIG. 12.

Figure 6:
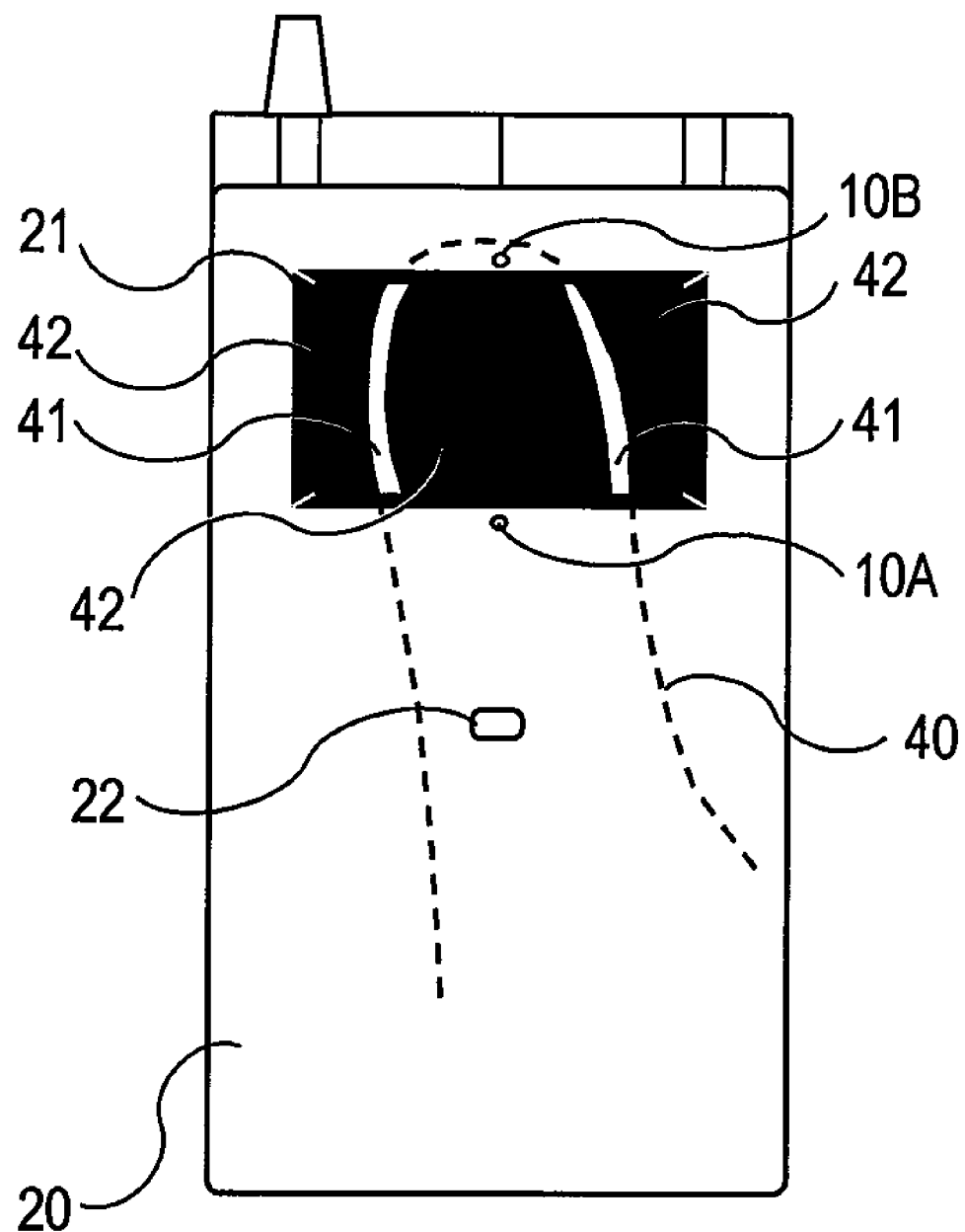
FIG. 6 is an explanatory diagram of another mask image which is displayed on the biometric authentication device when the subject is photographed in accordance with the first embodiment of this invention.

FIG. 6 is an explanatory diagram of another mask image which is displayed on the biometric authentication device 21 when the subject 1 is photographed according to the first embodiment of this invention.

When photographing the subject 1, the biometric authentication device 21 may display the mask image illustrated in FIG. 6 instead of the mask image illustrated in FIG. 4. In the mask image illustrated in FIG. 6, the outline region 43 alone is set as the irradiation region and other regions than the outline region 43 are set as the mask region.

The biometric authentication device 21 blocks infrared light that strays into the central part of the subject 1 through reflection or scattering by displaying the mask image of FIG. 6. The biometric authentication device 21 can thus improve the image quality of a picked up image even more.

Figure 7:
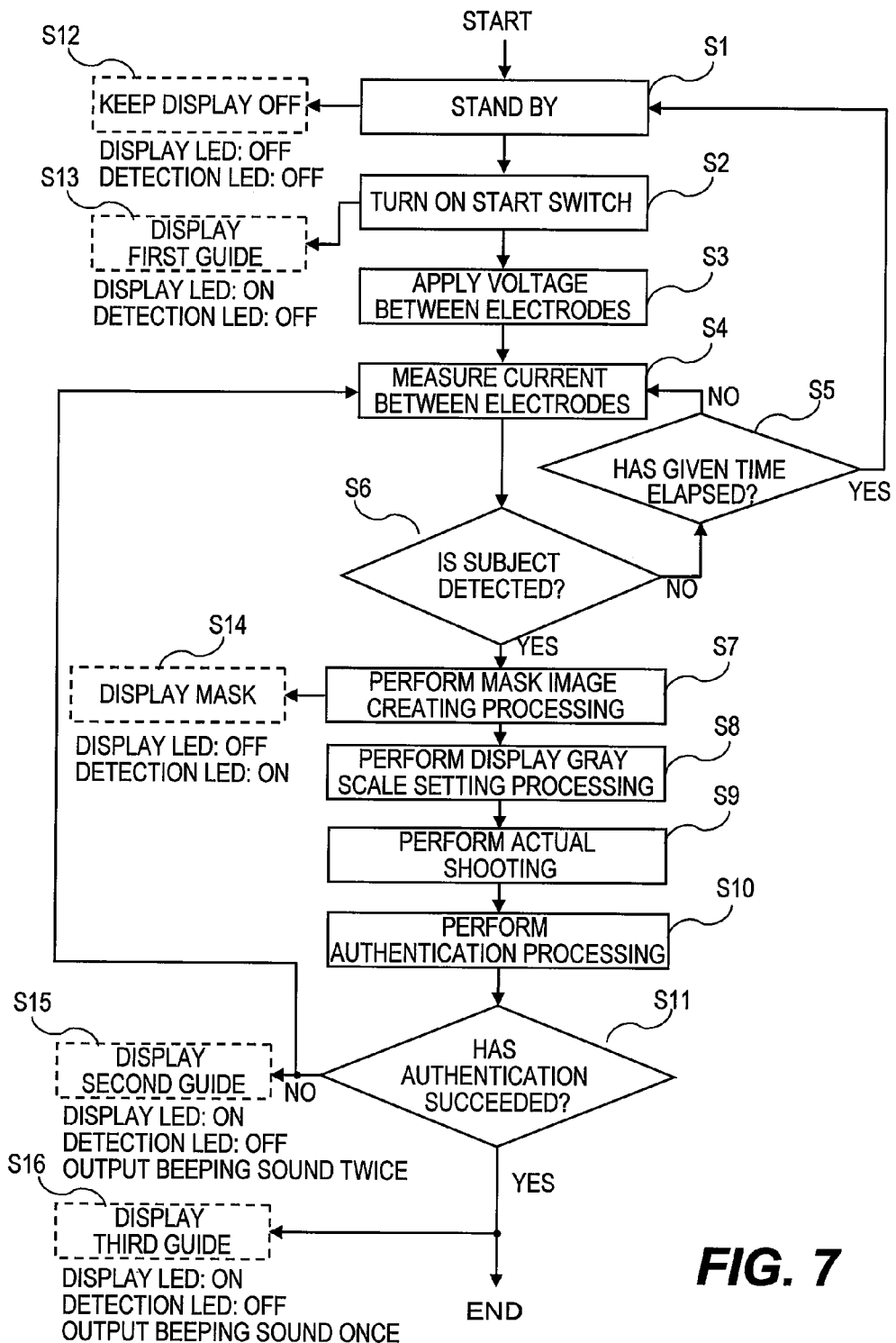
FIG. 7 is a flow chart of authentication processing that is executed by the biometric authentication device in accordance with the first embodiment of this invention.

FIG. 7 is a flow chart of authentication processing that is executed by the biometric authentication device 21 according to the first embodiment of this invention.

Steps shown in broken line in this flow chart indicate screen images displayed on the liquid crystal display board 5. The screen image displayed on the liquid crystal display board 5 is kept displayed until it is changed to the next screen image.

First, the biometric authentication device 21 stands by until the start switch 22 is operated (S1). Nothing is displayed on the liquid crystal display board 5 at this point (S12). The display LED 7 and the detection LED 8 are accordingly not lit.

When the start switch 22 is subsequently operated (S2), the biometric authentication device 21 applies a voltage between the electrode 10A and the electrode 10B (S3). At this point, the biometric authentication device 21 displays a first guide screen image illustrated in FIG. 8 on the liquid crystal display board 5 (S13). The biometric authentication device 21 lights the display LED 7 alone in accordance with what is displayed in the first guide screen image. In other words, the detection LED 8 is kept off.

Figure 8:
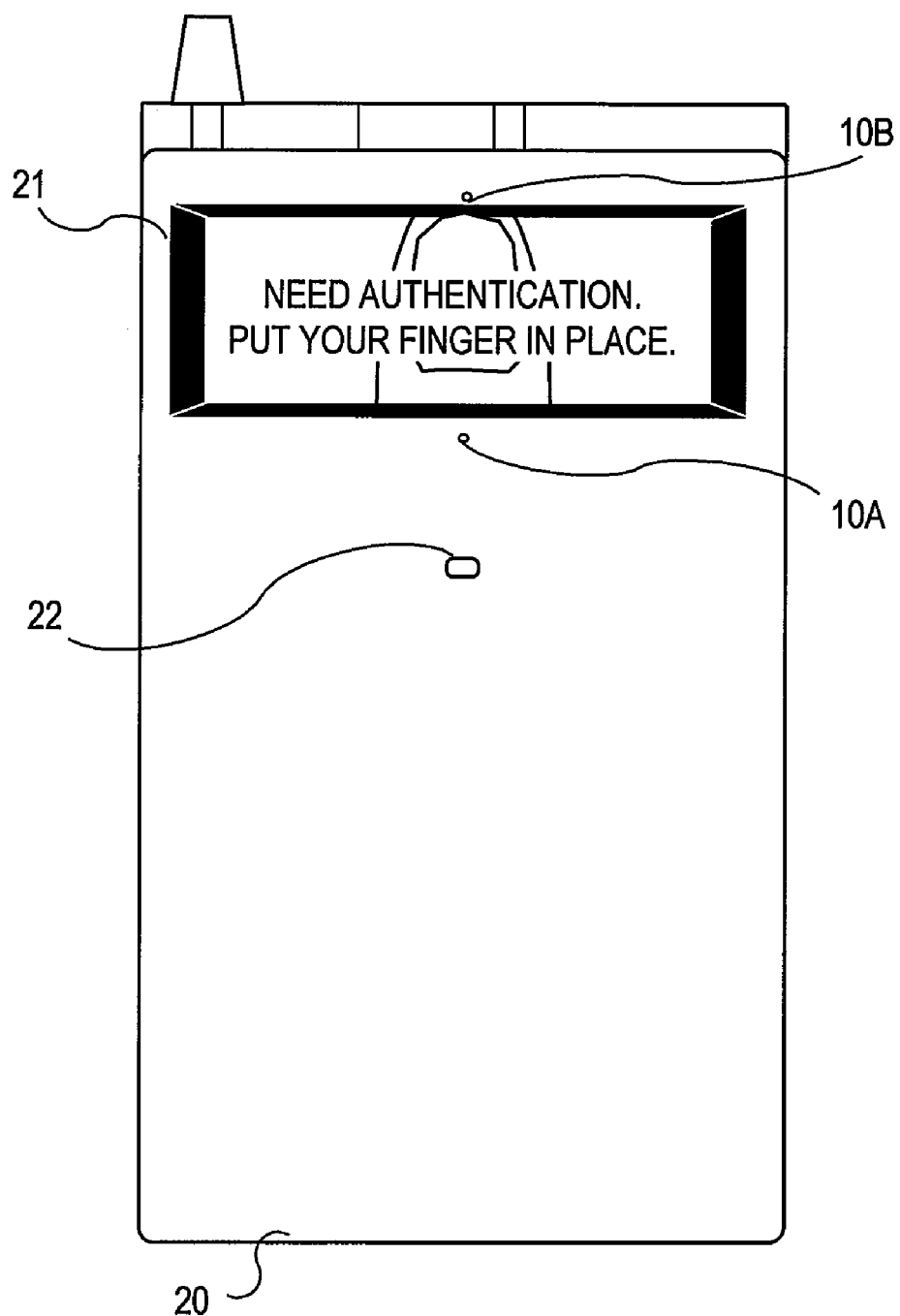
FIG. 8 is an explanatory diagram of a first guide screen image which is displayed on the biometric authentication device at the start of authentication in accordance with the first embodiment of this invention.

FIG. 8 is an explanatory diagram of the first guide screen image which is displayed on the biometric authentication device 21 at the start of authentication according to the first embodiment of this invention.

The biometric authentication device 21 instructs a user to put the subject 1 in place by displaying the first guide screen image. The first guide screen image may show where to place the subject 1. This way, the positioning accuracy of the subject 1 is improved and the misidentification ratio of biometric authentication by the biometric authentication device 21 is accordingly lowered.

The description now returns to FIG. 7.

After applying a voltage between the electrodes 10A and 10B, the biometric authentication device 21 measures a current value between the electrodes 10A and 10B (S4). The biometric authentication device 21 next determines from the measured current value whether or not the placing of the subject 1 has been detected (S6).

When the placing of the subject 1 has not been detected, the biometric authentication device 21 determines whether or not a given period of time has elapsed since the start switch 22 was operated. The given period of time is, for example, 30 seconds (S5).

When it is determined that the given period of time has elapsed, the biometric authentication device 21 returns to Step S1 to stand by.

When it is determined that the given period of time has not been elapsed, on the other hand, the biometric authentication device 21 returns to Step S4, where a current value between the electrodes 10A and 10B is measured again.

When the placing of the subject 1 has been detected in Step S6, the biometric authentication device 21 executes mask image creating processing (S7). In the mask image creating processing, the biometric authentication device 21 extracts the outline 40 of the subject 1 and, from the extracted outline 40, creates the mask image illustrated in FIG. 4 or FIG. 6. Details of the mask image creating processing will be described with reference to FIG. 11.

The biometric authentication device 21 displays the created mask image on the liquid crystal display board 5 (S14). As the mask image is displayed, the biometric authentication device 21 turns the display LED 7 off and turns the detection LED 8 on.

The biometric authentication device 21 next performs display gray scale setting processing (S8). Through this processing, the biometric authentication device 21 adjusts the liquid crystal gray scale of the irradiation region 41. Details of the display gray scale setting processing will be described with reference to FIG. 12.

The biometric authentication device 21 then executes actual shooting (S9). Through the actual shooting, the biometric authentication device 21 picks up an image that contains the pattern of the blood vessels 2.

The biometric authentication device 21 performs authentication based on the image picked up through the actual shooting (S10). The biometric authentication device 21 then determines whether or not the authentication has succeeded (S11).

When the authentication has failed, the biometric authentication device 21 returns to Step S4 to repeat the processing. At this point, the biometric authentication device 21 displays a second guide screen image illustrated in FIG. 9 on the liquid crystal display board 5 (S15). As the second guide screen image is displayed, the biometric authentication device 21 turns the display LED 7 on and turns the detection LED 8 off. The biometric authentication device 21 simultaneously sounds an alarm in a manner different from the one used to notify a success of authentication, for example, by making a beeping sound twice, in order to notify the user of authentication failure. The user can thus know of authentication failure while keeping the finger put on the biometric authentication device 21.

Figure 9:
FIG. 9 is an explanatory diagram of a second guide screen image which is displayed on the biometric authentication device when authentication fails in accordance with the first embodiment of this invention.

FIG. 9 is an explanatory diagram of the second guide screen image which is displayed on the biometric authentication device 21 when authentication fails according to the first embodiment of this invention.

The biometric authentication device 21 notifies the user of authentication failure and instructs the user to put the subject 1 in place by displaying the second guide screen image. The second guide screen image may show where to place the subject 1.

The description now returns to FIG. 7.

Figure 10:
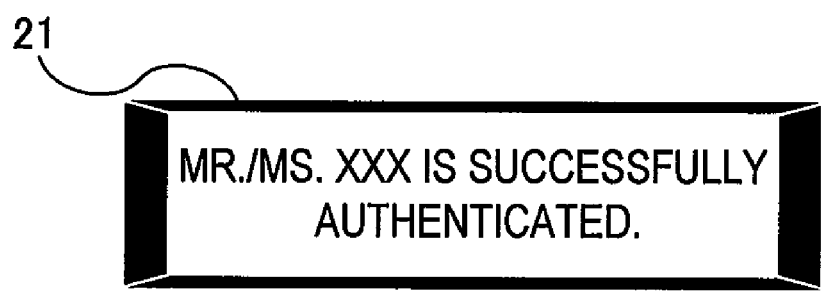
FIG. 10 is an explanatory diagram of a third guide screen image which is displayed on the biometric authentication device when authentication succeeds in accordance with the first embodiment of this invention.

In the case where the authentication succeeds in Step S11, the biometric authentication device 21 displays a third guide screen image illustrated in FIG. 10 on the liquid crystal display board 5 (S16). As the third guide screen image is displayed, the biometric authentication device 21 turns the display LED 7 on and turns the detection LED 8 off. The biometric authentication device 21 simultaneously sounds an alarm in a manner different from the one used to notify a failure of authentication, for example, by making a beeping sound once, in order to notify the user of authentication success. The user can thus know of authentication success while keeping the finger put on the biometric authentication device 21.

The biometric authentication device 21 then ends the authentication processing.

FIG. 10 is an explanatory diagram of the third guide screen image which is displayed on the biometric authentication device 21 when authentication succeeds according to the first embodiment of this invention.

The biometric authentication device 21 notifies the user of authentication success by displaying the third guide screen image. The third guide screen image may display the identifier or the like of the successfully authenticated user.

Figure 11:
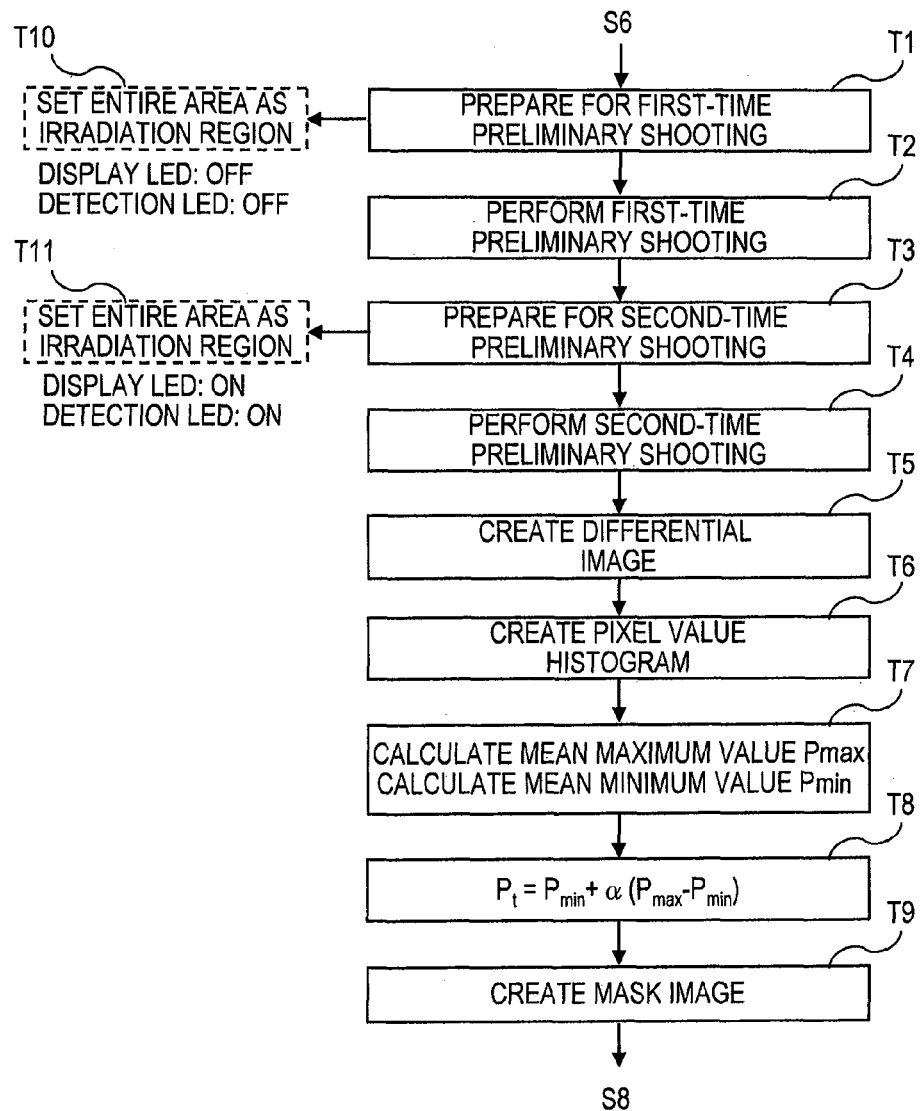
FIG. 11 is a flow chart of a mask image creating processing in accordance with the first embodiment of this invention.

FIG. 11 is a flow chart of the mask image creating processing according to the first embodiment of this invention.

Steps shown in broken line in this flow chart indicate screen images displayed on the liquid crystal display board 5. The screen image displayed on the liquid crystal display board 5 is kept displayed until it is changed to the next screen image.

The mask image creating processing is executed in Step S7 of the authentication processing (FIG. 7).

In the case where the placing of the subject 1 is detected in Step S6 of the authentication processing (FIG. 7), the biometric authentication device 21 prepares for first-time preliminary shooting (T1). The biometric authentication device 21 here displays on the liquid crystal display board 5 a screen image that contains no other region than the irradiation region (T10). At this point, the biometric authentication device 21 turns off the display LED 7 and the detection LED 8. The biometric authentication device 21 then executes the first-time preliminary shooting (T2).

The biometric authentication device 21 next prepares for second-time preliminary shooting (T3). The biometric authentication device 21 here keeps the screen image that contains no other region than the irradiation region displayed on the liquid crystal display board 5 (T11). The biometric authentication device 21 also lights at least one of the display LED 7 and the detection LED 8. The biometric authentication device 21 then executes the second-time preliminary shooting (T4).

The biometric authentication device 21 creates a differential image from an image obtained through the first-time preliminary shooting and an image obtained through the second-time preliminary shooting (T5). Specifically, the biometric authentication device 21 subtracts, for each pixel, the pixel value of the image obtained through the first-time preliminary shooting from the pixel value of the image obtained through the second-time preliminary shooting.

The created differential image is an image ridded of external light components incident on a region where the subject 1 is not placed (a region outside the outline 40 of the subject 1). In other words, the created differential image is solely of the region inside the outline 40 of the subject 1.

Therefore, the biometric authentication device 21 can accurately detect the placement location of the subject 1 by referring to the created differential image, irrespective of the state of external light.

The biometric authentication device 21 next creates a histogram of pixel values in the created differential image (T6). From the created histogram, the biometric authentication device 21 calculates a mean maximum value $P_{max}$ and mean minimum value $P_{min}$ of the pixel values (T7).

For example, the mean maximum value $P_{max}$ is an average of the pixel values of pixels that belong to the top 10% of the histogram out of all the pixels contained in the differential image. The mean minimum value $P_{min}$ is an average of the pixel values of pixels that belong to the bottom 10% of the histogram out of all the pixels contained in the differential image.

The biometric authentication device 21 may use a maximum sum pixel value and a minimum sum pixel value instead of the mean maximum value $P_{max}$ and the mean minimum value $P_{min}$. The maximum sum pixel value is the maximum value of the sum of pixel values that a given number of adjacent pixels (e.g., four adjacent pixels) take. The minimum sum pixel value is the minimum value of the sum of pixel values that the given number of adjacent pixels take.

The biometric authentication device 21 next uses the following Mathematical Expression (1) to calculate a threshold $P_t$, which is for discriminating the mask region 42 and the irradiation region 41 from each other (T8):

$$P_t = P_{min} + \alpha(P_{max} - P_{min}) \qquad (1)$$

$\alpha$ is a parameter for determining the threshold $P_t$, and is set in advance. The mask region 42 shrinks as $\alpha$ approaches "0" (as $\alpha$ becomes smaller). The mask region expands as $\alpha$ approaches "1" (as $\alpha$ becomes larger). A typical value of $\alpha$ is "0.2".

Based on the calculated threshold $P_t$, the biometric authentication device 21 creates the mask image illustrated in FIG. 4 (T9). In the created mask image, a pixel that has a pixel value equal to or larger than the threshold $P_t$ constitutes the mask region 42. A pixel that has a pixel value smaller than the threshold $P_t$ constitutes the irradiation region 41.

The biometric authentication device 21 then ends the mask image creating processing.

The biometric authentication device 21 in this example creates the mask image illustrated in FIG. 4. The biometric authentication device 21 can create the mask image illustrated in FIG. 6 through processing described below.

The biometric authentication device 21 uses the following Mathematical Expressions (2) and (3) in Step T8 to calculate thresholds $P_{t1}$ and $P_{t2}$, which are for discriminating the mask region 42 and the irradiation region 41 from each other (T8):

$$P_{t1} = P_{min} + \alpha_1(P_{max} - P_{min}) \qquad (2)$$

$$P_{t2} = P_{min} + \alpha_2(P_{max} - P_{min}) \qquad (3)$$

$\alpha_1$ is a parameter for determining the threshold $P_{t1}$, and is set in advance. $\alpha_2$ is a parameter for determining the threshold $P_{t2}$, and is set in advance. Here, $\alpha_1$ is larger than $\alpha_2$. A typical value of $\alpha_1$ is "0.2" and a typical value of $\alpha_2$ is "0.05".

Based on the calculated thresholds $P_{t1}$ and $P_{t2}$, the biometric authentication device 21 creates the mask image illustrated in FIG. 6 (T9). In the created mask image, a pixel that has a pixel value equal to or smaller than the threshold $P_{t2}$ and a pixel that has a pixel value equal to or larger than the threshold $P_{t1}$ constitute the mask region 42. A pixel that has a pixel value larger than the threshold $P_{t2}$ and smaller than the threshold $P_{t1}$ constitutes the irradiation region 41.

The biometric authentication device 21 creates the mask image illustrated in FIG. 6 in this manner.

Figure 12:
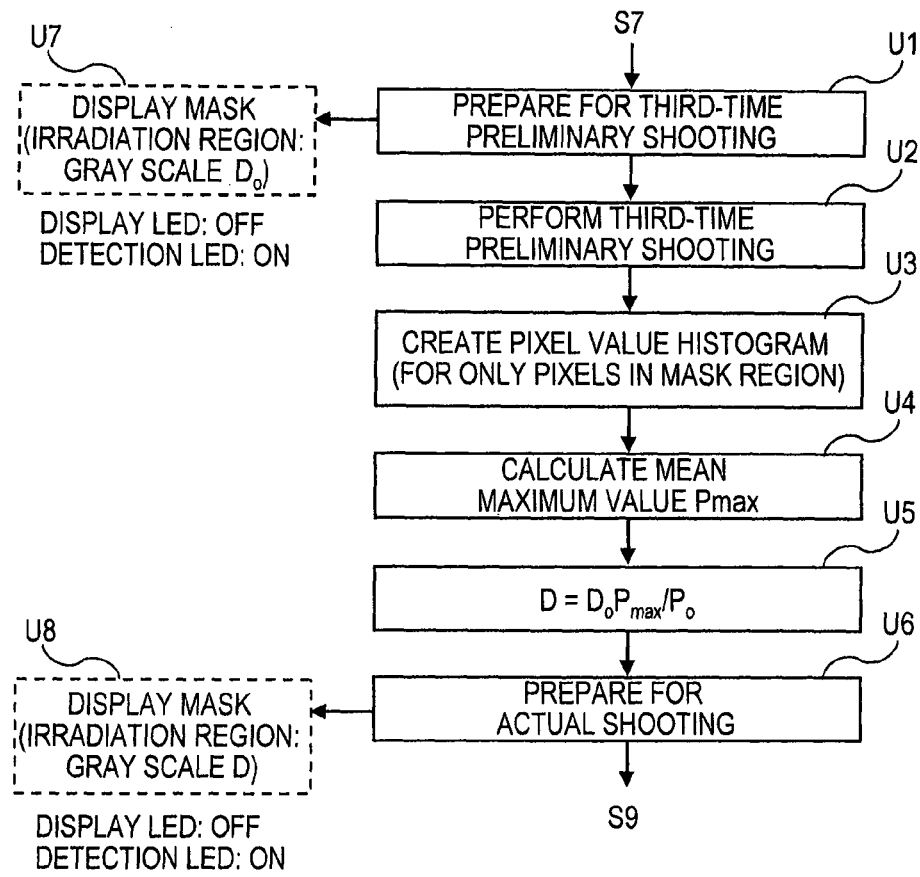
FIG. 12 is a flow chart of a display gray scale setting processing in accordance with the first embodiment of this invention.

FIG. 12 is a flow chart of the display gray scale setting processing according to the first embodiment of this invention.

Steps shown in broken line in this flow chart indicate screen images displayed on the liquid crystal display board 5. The screen image displayed on the liquid crystal display board 5 is kept displayed until it is changed to the next screen image.

The display gray scale setting processing is executed in Step S8 of the authentication processing (FIG. 7).

First, the biometric authentication device 21 prepares for third-time preliminary shooting (U1). The biometric authentication device 21 here displays on the liquid crystal display board 5 a mask image created in Step S7 of the authentication processing (U7). The liquid crystal gray scale of the irradiation region 41 contained in the displayed mask image is set to an initial value $D_0$. At this point, the biometric authentication device 21 turns off the display LED 7 alone. In other words, the detection LED 8 is kept lit. The biometric authentication device 21 then executes the third-time preliminary shooting (U2).

From an image obtained through the third-time preliminary shooting, the biometric authentication device 21 extracts pixels that correspond to the mask region 42 contained in the displayed mask image. Based on the pixel values of the extracted pixels which correspond to the mask region 42, the biometric authentication device 21 creates a histogram of pixel values in the image obtained through the third-time preliminary shooting (U6). In short, this histogram is solely about pixels that correspond to the mask region 42.

The biometric authentication device 21 calculates from the created histogram a mean maximum value $P_{max}$ of the pixel values (U4). The mean maximum value $P_{max}$ is, for example, an average of the pixel values of pixels that belong to the top 10% of the histogram out of all the pixels that correspond to the mask region 42.

The biometric authentication device 21 next uses the following Mathematical Expression (4) to calculate a liquid crystal gray scale D of the irradiation region 41 in the actual shooting (U5):

$$D = D_0 \times P_{max}/P_0 \qquad (4)$$

$P_0$ represents an objective value for the mean maximum value of pixel values in an image obtained through the actual shooting, and is set in advance.

Next, the biometric authentication device 21 prepares for the actual shooting (U6). The biometric authentication device 21 here displays a mask image created in Step S7 of the authentication processing on the liquid crystal display board 5 (U8). The liquid crystal gray scale D calculated in Step U5 is set to the irradiation region 41 of the displayed mask image. At this point, the biometric authentication device 21 keeps the display LED 7 turned off and keeps the detection LED 8 lit. The biometric authentication device 21 then ends the display gray scale setting processing.

By setting the calculated liquid crystal gray scale D to the irradiation region 41 of the mask image, the biometric authentication device 21 can set the mean maximum value of pixel values in the image obtained through the actual shooting to $P_0$. In other words, the biometric authentication device 21 prevents overexposure and underexposure by optimizing the intensity of light with which the subject 1 is irradiated in the actual shooting.

Figure 13:
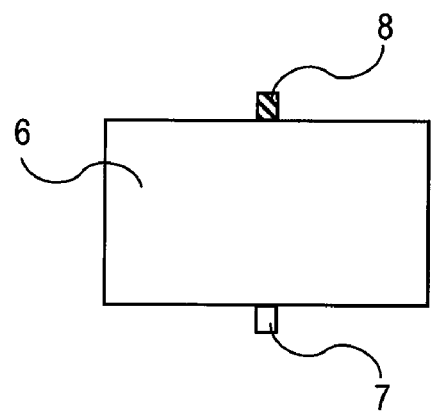
FIG. 13 is an explanatory diagram of an arrangement of a display LED and a detection LED in accordance with the first embodiment of this invention.

FIG. 13 is an explanatory diagram of the arrangement of the display LED 7 and the detection LED 8 according to the first embodiment of this invention.

In this explanatory diagram, the display LED 7 and the detection LED 8 are placed on sides that face the optical waveguide 6, with the display LED 7 above the optical waveguide 6 and the detection LED 8 below the optical waveguide 6. This arrangement may be reversed. The display LED 7 may also be placed on one of the right side and the left side while the detection LED 8 is placed on the other of the right side and the left side.

While one display LED 7 and one detection LED 8 are disposed in this explanatory diagram, there may be a plurality of display LEDs 7 and a plurality of detection LEDs 8.

Figure 14:
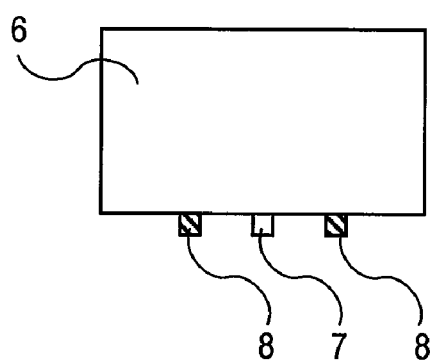
FIG. 14 is an explanatory diagram of an arrangement of a display LED and a detection LED in accordance with the first embodiment of this invention.

FIG. 14 is an explanatory diagram of the arrangement of the display LED 7 and the detection LED 8 according to the first embodiment of this invention.

In this explanatory diagram, the display LED 7 and the detection LED 8 are placed on the same side with respect to the optical waveguide 6, specifically, below the optical waveguide 6. The display LED 7 and the detection LED 8 may instead be placed above, to the right, or to the left of the optical waveguide 6.

The display LED 7 and the detection LED 8 may also be placed both above and below the optical waveguide 6. This way, unevenness in intensity of light is reduced in a top-bottom direction of the optical waveguide 6. Similarly, the display LED 7 and the detection LED 8 may be placed both to the right and left of the optical waveguide 6.

While one display LED 7 is disposed in this explanatory diagram, there may be a plurality of display LEDs 7. While two detection LEDs 8 are disposed in this explanatory diagram, there may be any number of detection LEDs 8.

As described above, in the biometric authentication device 21 of this embodiment, the display LED 7 and the detection LED 8 are placed so as to share the same optical waveguide 6. The biometric authentication device 21 can thus be reduced in size.

Figure 15:
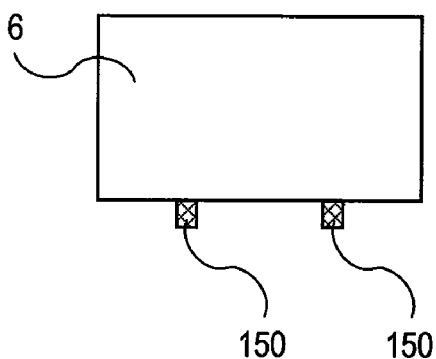
FIG. 15 is an explanatory diagram of an arrangement of a display/detection LED in accordance with the first embodiment of this invention.

FIG. 15 is an explanatory diagram of the arrangement of a display/detection LED 150 according to the first embodiment of this invention.

The biometric authentication device 21 may include the display/detection LED 150 instead of the display LED 7 and the detection LED 8. Then, the size of the biometric authentication device 21 can be reduced even further. The display/detection LED 150 includes a white light source for display use and an infrared light source for detection use.

In this explanatory diagram, the display/detection LEDs 150 are placed below the optical waveguide 6. Alternatively, the display/detection LEDs 150 may be placed above, to the right, or to the left of the optical waveguide 6. The display/detection LEDs 150 may also be placed both above and below the optical waveguide 6. Similarly, the display/detection LEDs 150 may be placed both to the right and left of the optical waveguide 6.

While two display/detection LEDs 150 are disposed in this explanatory diagram, there may be any number of display/detection LEDs 150.

Figure 16:
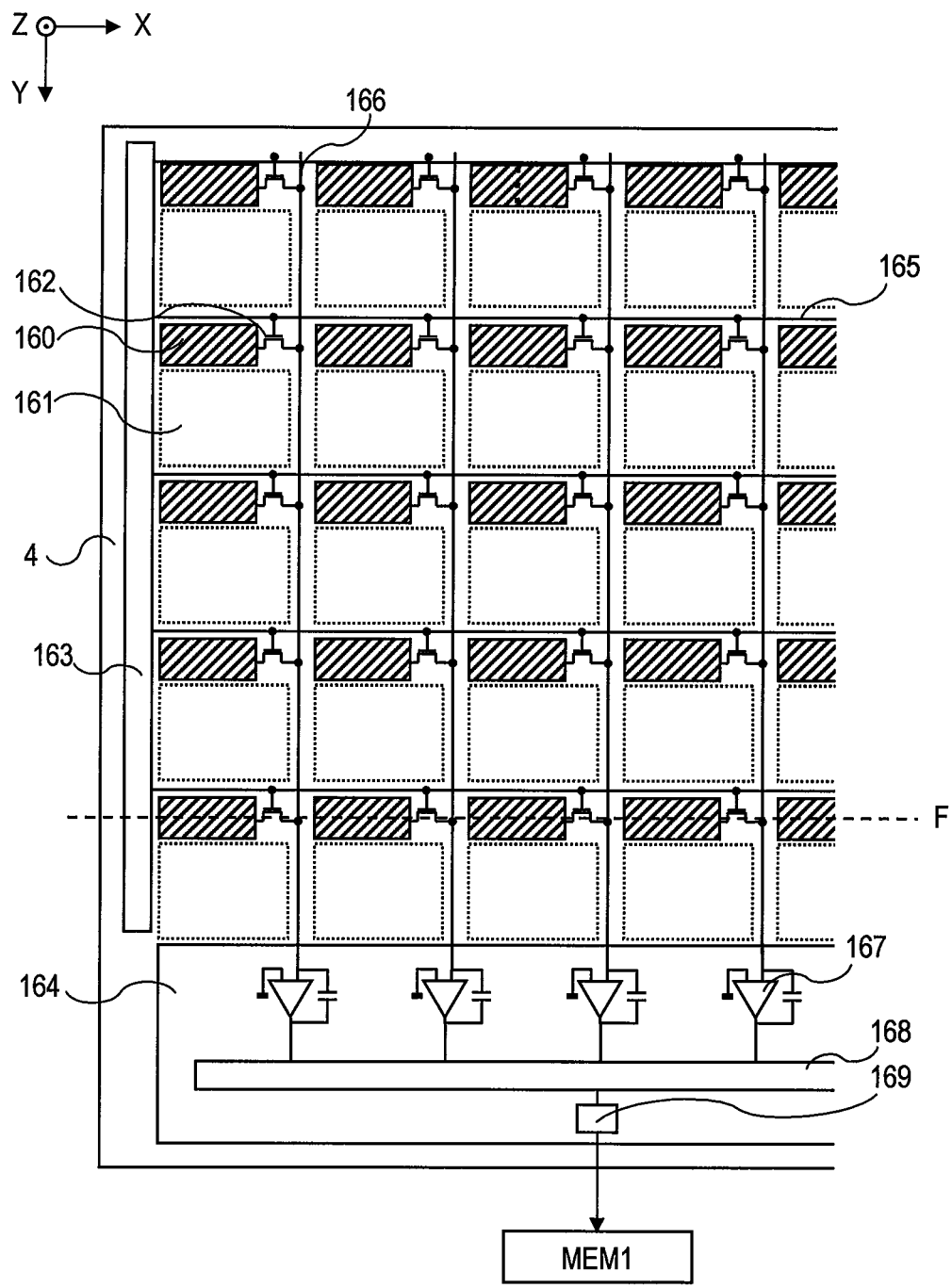
FIG. 16 is a top view of a sensor board that is provided in the biometric authentication device in accordance with the first embodiment of this invention.

FIG. 16 is a top view of the sensor board 4 that is provided in the biometric authentication device 21 according to the first embodiment of this invention.

The sensor board 4 includes photodiodes 160, light transmissive regions 161, thin film transistor (TFT) switches 162, a shift register 163, a signal reading circuit 164, gate lines 165, data lines 166, and others.

The photodiodes 160, the TFT switches 162, the shift register 163, the gate lines 165, and the data lines 166 are formed on a glass substrate (omitted from the drawing). These are formed with the use of a known technology of laminating amorphous silicon or polysilicon on a glass substrate.

The light transmissive regions 161 are regions that transmit white light emitted from the display LED 7 and infrared light emitted from the detection LED 8.

The gate lines 165 couple the shift register 163 to gates of the TFT switches 162. The gate lines 165 are used to supply a voltage to the gates of the TFT switches 162.

The photodiodes 160 are coupled to one end of the data lines 166 via the TFT switches 162. The other end of the data lines 166 are coupled to the signal reading circuit 164. The data lines 166 are used to read charge signals from the photodiodes 160.

The signal reading circuit 164 is formed on a single crystal silicon substrate by a known CMOS process or the like.

The signal reading circuit 164 includes charge amplifiers 167, a multiplexer 168, an A/D converter 169, and others.

The data lines 166 formed on a glass substrate and the signal reading circuit 164 formed on a single crystal silicon substrate are electrically coupled to each other by a bonding wire (omitted from the drawing).

Part of light output from below the sensor board 4 is transmitted through the light transmissive regions 161 and output to a space above the sensor board 4. Part of light entering from above the sensor board 4 is converted into charge signals by the photodiodes 160. In the case where the TFT switches 162 are shut off, the charge signals obtained by the conversion are accumulated in junctions of the photodiodes 160. When the TFT switches 162 are turned on, the charge signals accumulated in the junctions of the photodiodes 160 are sent to the charge amplifiers 167 via the data lines 166.

The charge amplifiers 167 integrate the received charge signals and output voltage signals which are generated by the integration to the A/D converter 169. The A/D converter 169 converts the signals input from the charge amplifiers 167 into digital signals. The A/D converter 169 stores the digital signals obtained by the conversion in the detected image memory MEM1. In the manner described above, the detected image memory MEM1 stores an image picked up by the sensor board 4.

The shift register 163, on the other hand, supplies a voltage to the gates of the TFT switches 162 via the gate lines 165. The shift register 163 thus turns the TFT switches 162 on and off. The shift register 163 supplies a voltage to the gate lines 165 sequentially, moving from one gate line 165 to another along the Y axis direction.

The multiplexer 168 selects the charge amplifiers 167 sequentially along the X axis direction as a charge amplifier that outputs signals to the A/D converter 169.

Figure 17:
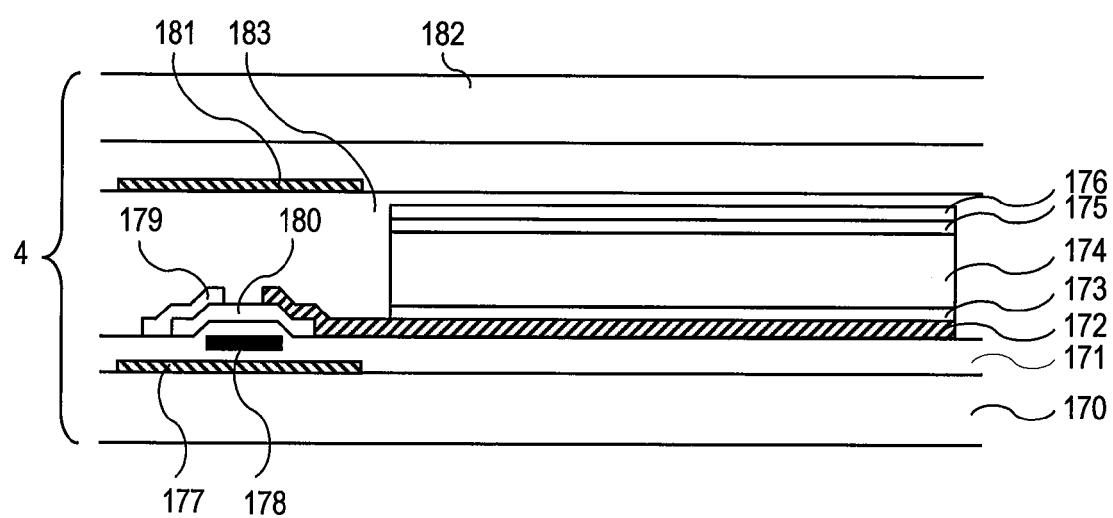
FIG. 17 is a side view in section of the sensor board that is provided in the biometric authentication device in accordance with the first embodiment of this invention.

FIG. 17 is a side view in section of the sensor board 4 that is provided in the biometric authentication device 21 according to the first embodiment of this invention.

This explanatory diagram is a side view in section at a point F illustrated in FIG. 16.

The sensor board 4 includes a glass substrate 170, an insulating film 171, a drain electrode 172, an n-type layer 173, an i-type layer 174, a p-type layer 175, a transparent electrode 176, a lower light shielding film 177, a gate electrode 178, a source electrode 179, a semiconductor film 180, an upper light shielding film 181, a protective glass 182, an interlayer film 183, and others.

The protective glass 182 is placed on top of the sensor board 4 to protect the interior of the sensor board 4. The semiconductor film 180, the drain electrode 172, the gate electrode 178, and the source electrode 179 constitute each TFT switch 162.

The n-type layer 173, the i-type layer 174, and the p-type layer 175 constitute each photodiode 160. The n-type layer 173, the i-type layer 174, and the p-type layer 175 are each formed from amorphous silicon that is small in leak current.

The transparent electrode 176 is formed from a known material such as indium tin oxide (ITO). Part of light entering from above the sensor board 4 is transmitted through the transparent electrode 176 and enters the photodiodes 160.

The drain electrode 172 serves both as the drain electrode of the TFT switch 162 and as an electrode of the photodiode 160 that is on the side of the n-type layer 173, and couples the photodiode 160 and the TFT switch 162 to each other. The drain electrode 172 is formed so as to cover the entire bottom face of the photodiode 160. Light entering the photodiode 160 from below the sensor board 4 is thus blocked. The drain electrode 172 is formed from aluminum, chromium, or the like.

The lower light shielding film 177 and the upper light shielding film 181 are formed from a known light shielding material. The lower light shielding film 177 blocks light that enters the TFT switch 162 from below the sensor board 4. The upper light shielding film 181 blocks light that enters the TFT switch 162 from above the sensor board 4. These light shielding films prevent a malfunction of the TFT switch 162 due to photoelectric effects.

As has been described, in the biometric authentication device 21 of this embodiment, the sensor board 4 for biometric authentication is placed on a liquid crystal display that is mounted to a cellular phone or the like. The biometric authentication device 21 irradiates the subject 1 uniformly with infrared light, utilizing the optical waveguide 6 which is used in a backlight of the liquid crystal display. The biometric authentication device 21 can thus obtain a picked up image in which the light intensity distribution is stable regardless of variations in where the subject 1 is placed.

Further, the biometric authentication device 21 of this embodiment controls the infrared light irradiation range and irradiation light intensity by displaying a mask image on the liquid crystal display. The biometric authentication device 21 can therefore pick up an image having a high contrast-to-noise ratio at an appropriate exposure level.

It is concluded from the effects described above that the biometric authentication device 21 of this embodiment is capable of executing biometric authentication with high precision.

Second Embodiment

The biometric authentication device 21 of a second embodiment of this invention executes biometric authentication based on images that are obtained by performing actual shooting twice.

The biometric authentication device 21 of the second embodiment has the same structure as the biometric authentication device structure (FIG. 1) of the first embodiment. A detailed description on the structure is therefore omitted here. Authentication processing that is executed by the biometric authentication device 21 of the second embodiment is the same as the authentication processing (FIG. 7) executed by the biometric authentication device 21 of the first embodiment, except Steps S8 and S9. Descriptions on the same processing steps are therefore omitted here.

Figure 18:
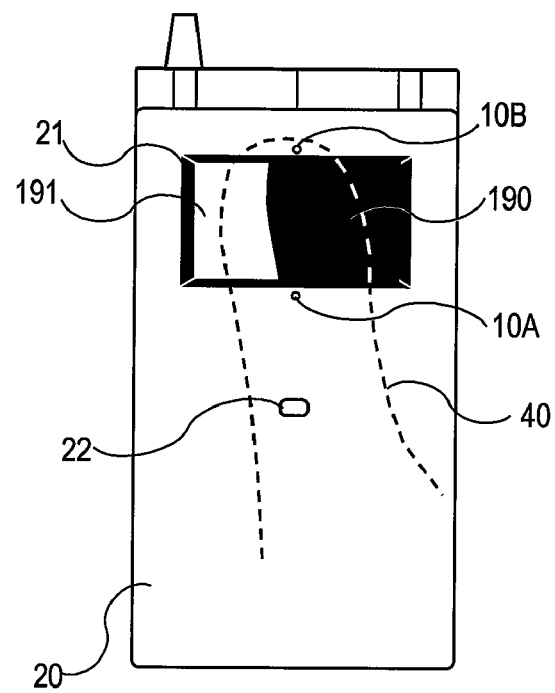
FIG. 18 is an explanatory diagram of an actual shooting mask image A, which is displayed on the biometric authentication device in first-time actual shooting in accordance with a second embodiment of this invention.
Figure 19:
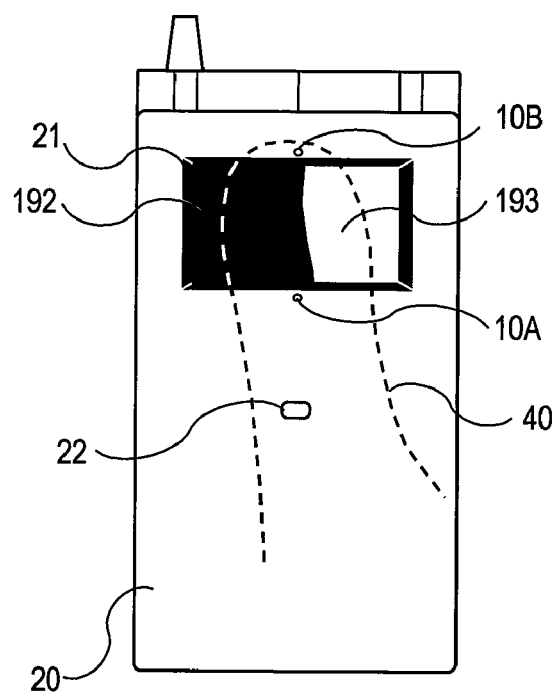
FIG. 19 is an explanatory diagram of an actual shooting mask image B, which is displayed on the biometric authentication device in second-time actual shooting in accordance with the second embodiment of this invention.

FIG. 18 is an explanatory diagram of an actual shooting mask image A, which is displayed on the biometric authentication device 21 in first-time actual shooting according to the second embodiment of this invention. FIG. 19 is an explanatory diagram of an actual shooting mask image B, which is displayed on the biometric authentication device 21 in second-time actual shooting according to the second embodiment of this invention.

The biometric authentication device 21 in this embodiment executes actual shooting twice. In the first-time actual shooting, the biometric authentication device 21 displays the actual shooting mask image A. In the second-time actual shooting, the biometric authentication device 21 displays the actual shooting mask image B.

The actual shooting mask image A contains a mask region 190 and an irradiation region 191. The actual shooting mask image B contains a mask region 192 and an irradiation region 193. The mask regions 190 and 192 are regions that are displayed black by the liquid crystal on the display screen. The irradiation regions 191 and 193 are regions in which the subject 1 is irradiated with light, and correspond to other regions than the mask regions 190 and 192.

The mask region 190 contained in the actual shooting mask image A contains a region slightly larger than the right half of a region inside the outline 40 of the subject 1. The mask region 192 contained in the actual shooting mask image B contains a region slightly larger than the left half of a region inside the outline 40 of the subject 1.

The biometric authentication device 21 of the second embodiment composites an image obtained through the first-time actual shooting and an image obtained through the second-time actual shooting. In this way, the biometric authentication device 21 of the second embodiment obtains a composite image containing the pattern of the blood vessels 2 near the outline 40 of the subject 1. As a result, the biometric authentication device 21 of the second embodiment can execute biometric authentication with higher precision than the biometric authentication device of the first embodiment.

Figure 20:
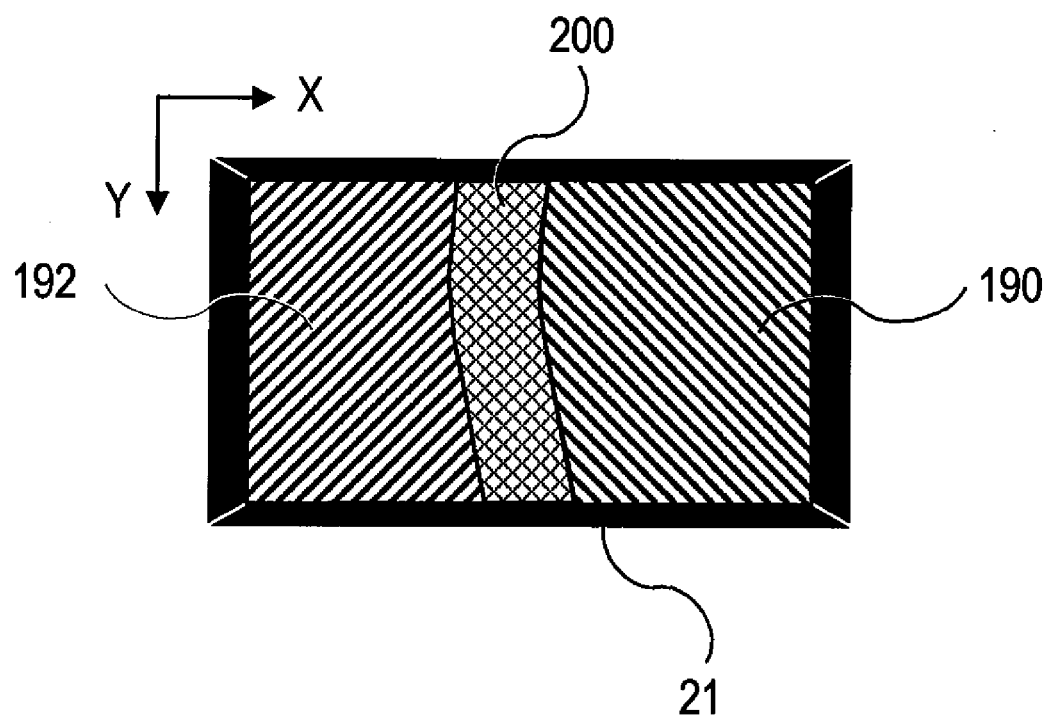
FIG. 20 is an explanatory diagram of positional relation between an actual shooting mask image A and an actual shooting mask image B in accordance with the second embodiment of this invention.

FIG. 20 is an explanatory diagram of the positional relation between the actual shooting mask image A and the actual shooting mask image B according to the second embodiment of this invention.

In this explanatory diagram, the actual shooting mask image A and the actual shooting mask image B overlap with each other. As can be seen in this explanatory diagram, an overlapping mask region 200 is provided between the actual shooting mask image A and the actual shooting mask image B. The overlapping mask region 200 is a region in which the mask region 190 contained in the actual shooting mask image A and the mask region 192 contained in the actual shooting mask image B overlap with each other. Accordingly, in the overlapping mask region 200, an image of the subject 1 is picked up redundantly in the first-time actual shooting and the second-time actual shooting.

The picked up images have a problem in that the pixel value rises around borders between the mask regions 190 and 192 and the irradiation regions 191 and 193. The cause of this problem is scattered light which is generated in the process of the transmission of infrared light through the sensor board 4, and strays into the vicinity of the borders between the mask regions 190 and 192 and the irradiation regions 191 and 193 and is measured accidentally.

To solve this problem, the biometric authentication device 21 composites an image obtained through the first-time actual shooting and an image obtained through the second-time actual shooting after removing data of the vicinity of the borders between the mask regions 190 and 192 and the irradiation regions 191 and 193. The discontinuity in pixel value in a composite image is reduced in this manner.

In short, the overlapping mask region 200 is provided in order to prevent the removal of data of the vicinity of the borders from creating an unphotographed region in a composite image.

Figure 21:
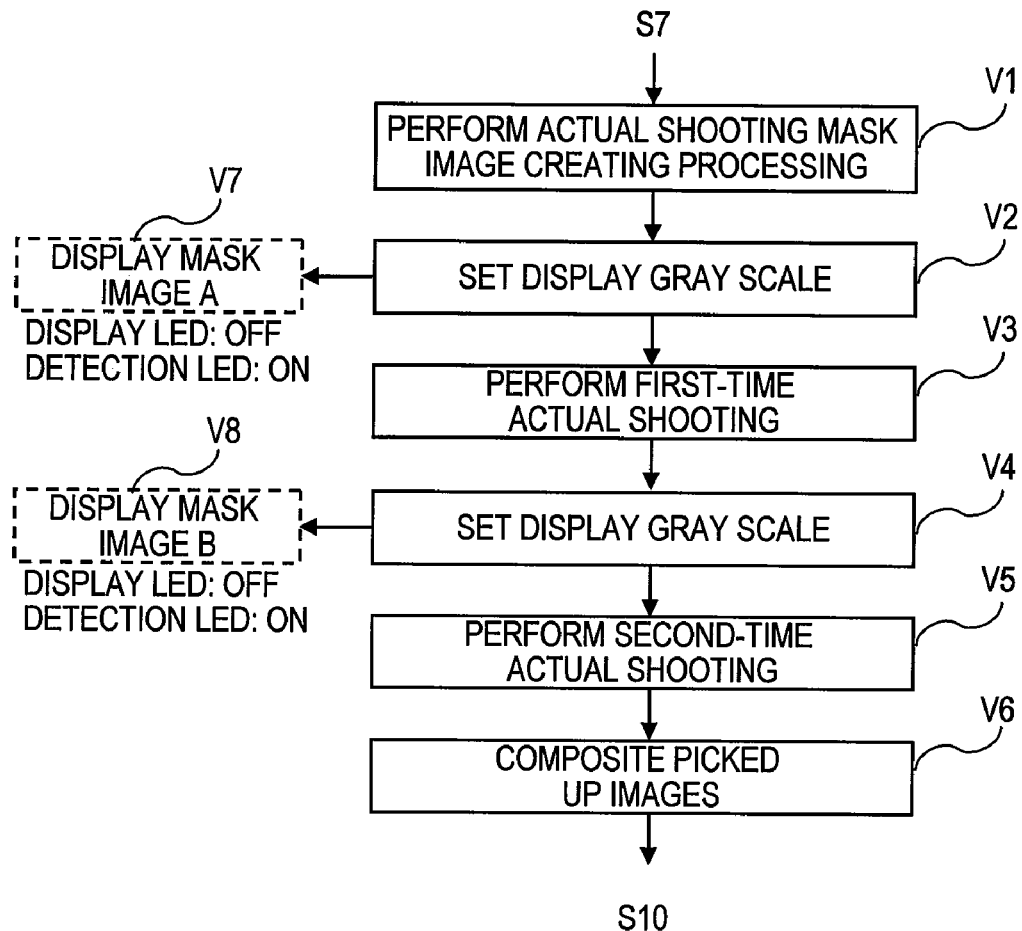
FIG. 21 is a flow chart of authentication processing that is executed by the biometric authentication device in accordance with the second embodiment of this invention.

FIG. 21 is a flow chart of authentication processing that is executed by the biometric authentication device 21 according to the second embodiment of this invention.

Steps shown in broken line in this flow chart indicate screen images displayed on the liquid crystal display board 5. The screen image displayed on the liquid crystal display board 5 is kept displayed until it is changed to the next screen image.

The biometric authentication device 21 first executes Steps S1 to S7. Steps S1 to S7 are the same as those in the authentication processing (FIG. 7) of the first embodiment, and descriptions thereof are omitted here.

After creating a mask image in Step S7, the biometric authentication device 21 executes actual shooting mask image creating processing (V1). In the actual shooting mask image creating processing, the biometric authentication device 21 creates, from the created mask image, the actual shooting mask image A and the actual shooting mask image B. Details of the actual shooting mask image creating processing will be described with reference to FIG. 22.

The biometric authentication device 21 next performs the display gray scale setting processing (FIG. 12) of the actual shooting mask image A (V2). Through this processing, the biometric authentication device 21 displays the created actual shooting mask image A on the liquid crystal display board 5 (V7). The liquid crystal gray scale D calculated in Step U5 of the display gray scale setting processing is set to the irradiation region 191 of the displayed actual shooting mask image A. At this point, the biometric authentication device 21 turns the display LED 7 off and turns the detection LED 8 on. The biometric authentication device 21 then executes the first-time actual shooting (V3).

The biometric authentication device 21 next performs the display gray scale setting processing (FIG. 12) of the actual shooting mask image B (V4). Through this processing, the biometric authentication device 21 displays the created actual shooting mask image B on the liquid crystal display board 5 (V8). The liquid crystal gray scale D calculated in Step U5 of the display gray scale setting processing is set to the irradiation region 193 of the displayed actual shooting mask image B. At this point, the biometric authentication device 21 turns the display LED 7 off and turns the detection LED 8 on. The biometric authentication device 21 then executes the second-time actual shooting (V5).

The biometric authentication device 21 composites an image obtained through the first-time actual shooting and an image obtained through the second-time actual shooting (V6). The biometric authentication device 21 thus obtains a composite image containing the pattern of the blood vessels 2.

Thereafter, the biometric authentication device 21 executes Steps S10 and S11. Steps S10 and S11 are the same as those in the authentication processing (FIG. 7) of the first embodiment, and descriptions thereof are omitted here. The biometric authentication device 21 then ends the authentication processing.

Figure 22:
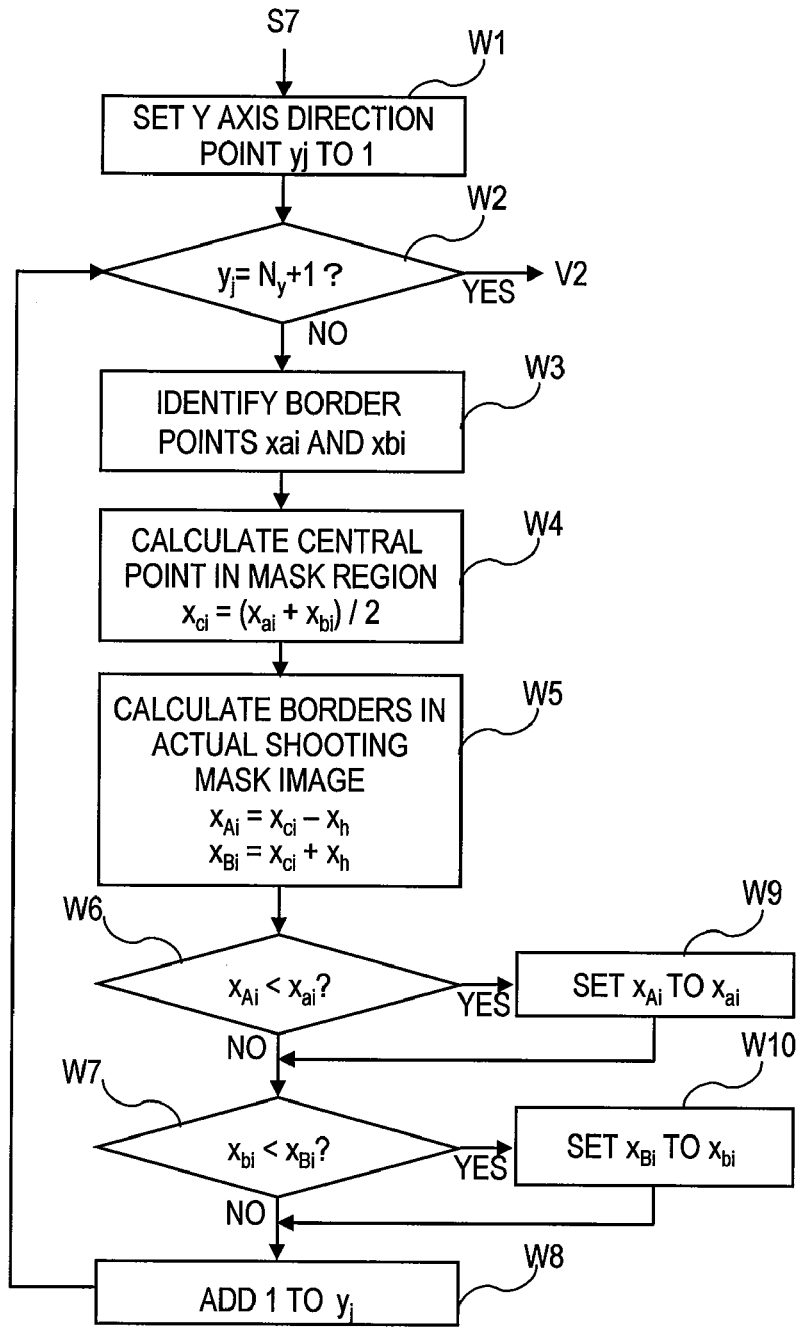
FIG. 22 is a flow chart of the actual shooting mask image creating processing in accordance with the second embodiment of this invention.

FIG. 22 is a flow chart of the actual shooting mask image creating processing according to the second embodiment of this invention.

The actual shooting mask image creating processing is executed in Step V1 of the authentication processing (FIG. 21).

In FIG. 22, x represents the position in the X axis direction and y represents the position in the Y axis direction. $N_x$ represents the pixel count in the X axis direction of a mask image, and $N_y$ represents the pixel count in the Y axis direction of the mask image. The position of a pixel contained in the mask image is indicated by $(x_i, y_j)$, where i is 1 to $N_x$ and j is 1 to $N_y$.

After creating a mask image (FIG. 4) in Step S7, the biometric authentication device 21 sets "1" to the currently processed point $y_j$ in the Y axis direction (W1). The biometric authentication device 21 next determines whether or not the currently processed point $y_j$ is the same as a value obtained by adding "1" to $N_y$ (W2).

When the currently processed point $y_j$ is the same as a value obtained by adding "1" to $N_y$, it means that every point in the Y axis direction has been processed. Then, the biometric authentication device 21 ends the actual shooting mask image creating processing and proceeds to Step V2 of the authentication processing (FIG. 21).

When the currently processed position $y_j$ differs from a value obtained by adding "1" to $N_y$, on the other hand, it means that some points in the Y axis direction have not been processed yet. Then, the biometric authentication device 21 identifies border points $x_{ai}$ and $x_{bi}$ between the irradiation region 41 and the mask region 42 at the currently processed point $y_j$ in the mask image created in Step S7 (W3). Here, the border point $x_{bi}$ is larger than the border point $x_{ai}$. Specifically, the biometric authentication device 21 identifies two points at which a rapid change in pixel value of the currently processed point $y_j$ is observed as the border points $x_{ai}$ and $x_{bi}$.

From the identified border points $x_{ai}$ and $x_{bi}$, the biometric authentication device 21 calculates a central point $x_{ci}$ in the mask region 42 at the currently processed point $y_j$ (W4). Specifically, the biometric authentication device 21 calculates the central point $x_{ci}$ using the following Mathematical Expression (5):

$$x_{ci} = (x_{ai} + x_{bi})/2 \quad (5)$$

The biometric authentication device 21 calculates from the obtained central point $x_{ci}$ a border point $x_{Ai}$ between the irradiation region 191 and the mask region 190 at the currently processed point $y_j$ of the actual shooting mask image A. Specifically, the biometric authentication device 21 calculates the border point $x_{Ai}$ using the following Mathematical Expression (6):

$$x_{Ai} = x_{ci} - x_h \quad (6)$$

The symbol $x_h$ represents a value obtained by dividing the width in the X axis direction of the overlapping mask region 200 (see FIG. 20) at the currently processed point $y_j$ by "2", and is set in advance.

The biometric authentication device 21 next calculates from the obtained central point $x_{ci}$ a border point $x_{Bi}$ between the irradiation region 193 and the mask region 192 at the currently processed point $y_j$ of the actual shooting mask image B (W5). Specifically, the biometric authentication device 21 calculates the border point $x_{Bi}$ using the following Mathematical Expression (7):

$$x_{Bi}=x_{ci}+x_h \quad (7)$$

Next, the biometric authentication device 21 determines whether or not the border point $x_{Ai}$ calculated in Step W5 is smaller than the border point $x_{ai}$ identified in Step W3 (W6).

When the border point $x_{Ai}$ is equal to or larger than the border point $x_{ai}$, the border point $x_{Ai}$ is inside the outline 40 of the subject 1. The biometric authentication device 21 therefore proceeds directly to Step W7.

When the border point $x_{Ai}$ is smaller than the border point $x_{ai}$, on the other hand, the border point $x_{Ai}$ is outside the outline 40 of the subject 1. The biometric authentication device 21 therefore sets the border point $x_{Ai}$ between the irradiation region 191 and the mask region 190 at the currently processed point $y_j$ of the actual shooting mask image A to the border point $x_{ai}$ identified in Step W3 (W9).

Next, the biometric authentication device 21 determines whether or not the border point $x_{Bi}$ calculated in Step W5 is larger than the border point $x_{bi}$ identified in Step W3 (W7).

When the border point $x_{Bi}$ is equal to or smaller than the border point $x_{bi}$, the border point $x_{Bi}$ is inside the outline 40 of the subject 1. The biometric authentication device 21 therefore proceeds directly to Step W8.

When the border point $x_{Bi}$ is larger than the border point $x_{bi}$, on the other hand, the border point $x_{Bi}$ is outside the outline 40 of the subject 1. The biometric authentication device 21 therefore sets the border point $x_{Bi}$ between the irradiation region 193 and the mask region 192 at the currently processed point $y_j$ of the actual shooting mask image B to the border point $x_{bi}$ identified in Step W3 (W10).

In this manner, the biometric authentication device 21 determines the border point $x_{Ai}$ of the actual shooting mask image A and the border point $x_{Bi}$ of the actual shooting mask image B at the currently processed point $y_j$.

The biometric authentication device 21 next adds "1" to the currently processed point $y_j$ (W8) and returns to Step W2.

As has been described, the biometric authentication device 21 of the second embodiment performs actual shooting twice using two mask images that contain mask regions different from each other. The biometric authentication device 21 composites images obtained through the actual shooting performed twice. As a result, the biometric authentication device 21 obtains a composite image that contains the pattern of the blood vessels 2 throughout the entire region inside the outline 40 of the subject 1. The biometric authentication device 21 is thus capable of executing biometric authentication with high precision.

Third Embodiment

The biometric authentication device 21 of a third embodiment of this invention uses a transmissive mask image in actual shooting.

The biometric authentication device 21 of the third embodiment has the same structure as the biometric authentication device structure (FIG. 1) of the first embodiment. A detailed description on the structure is therefore omitted here. Authentication processing that is executed by the biometric authentication device 21 of the third embodiment is the same as the authentication processing (FIG. 7) executed by the biometric authentication device 21 of the first embodiment, except Steps S7 and S8. Descriptions on the same processing steps are therefore omitted here.

Figure 23:
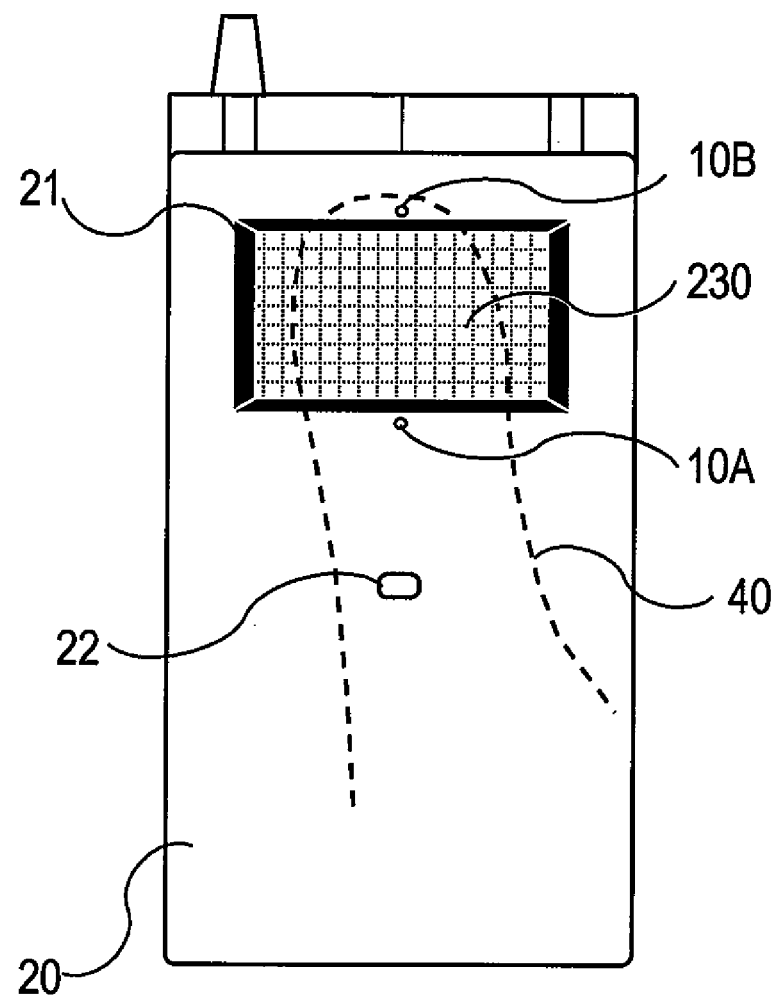
FIG. 23 is an explanatory diagram of a transmissive mask image, which is displayed on the biometric authentication device when the subject is photographed in accordance with a third embodiment of this invention.

FIG. 23 is an explanatory diagram of a transmissive mask image 230, which is displayed on the biometric authentication device 21 when the subject 1 is photographed according to the third embodiment of this invention.

All regions in the transmissive mask image 230 are translucent to infrared light. The biometric authentication device 21 adjusts the liquid crystal gray scale of the transmissive mask image 230 using a method that will be described later with reference to FIG. 24. The biometric authentication device 21 thus removes a back trend component contained in a picked up image, which enables the biometric authentication device 21 to match the signal level of the pattern of the blood vessels 2 to the dynamic range of the sensor board 4. The biometric authentication device 21 can therefore obtain a picked up image of high contrast-to-noise ratio and is consequently capable of executing biometric authentication with high precision.

Figure 24:
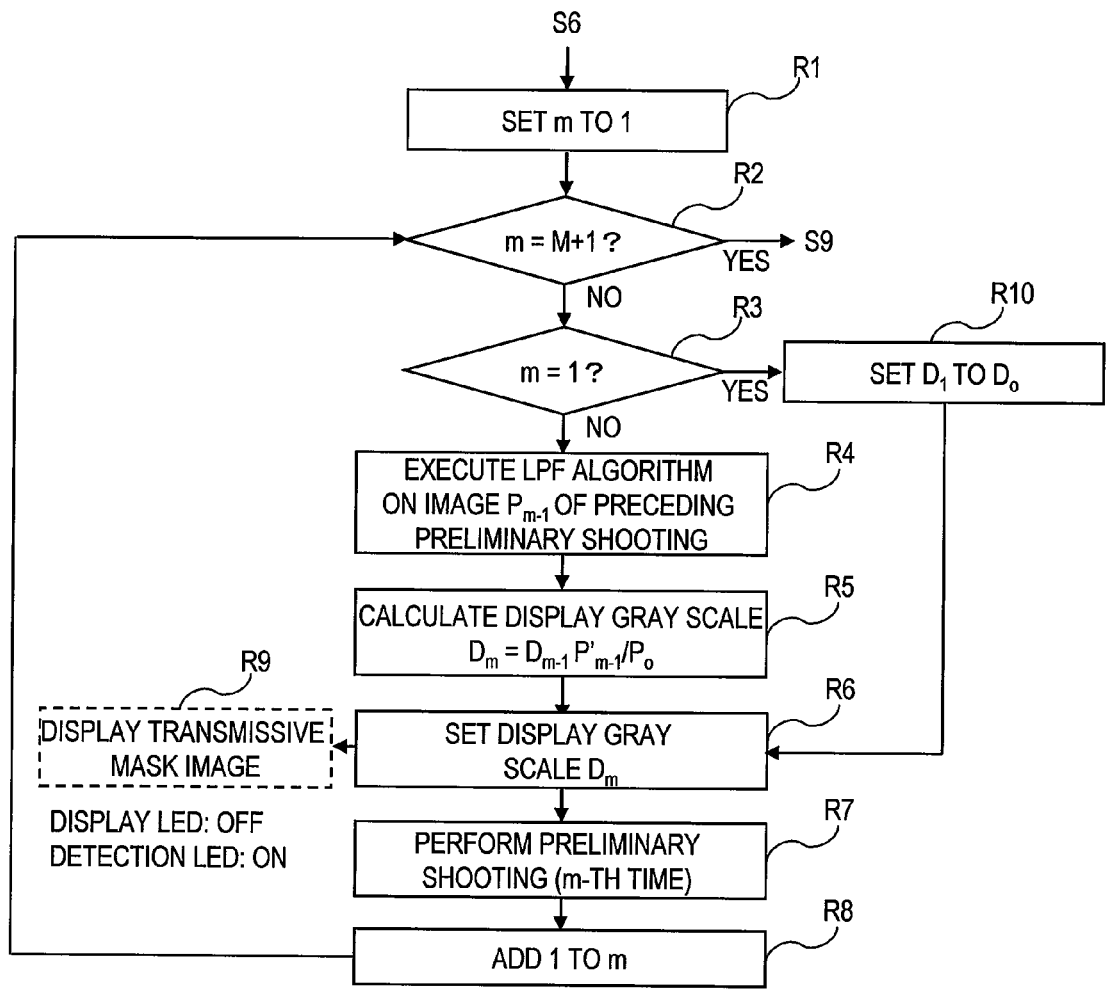
FIG. 24 is a flow chart of authentication processing that is executed by the biometric authentication device in accordance with the third embodiment of this invention.

FIG. 24 is a flow chart of authentication processing that is executed by the biometric authentication device 21 according to the third embodiment of this invention.

A step shown in broken line in this flow chart indicates a screen image displayed on the liquid crystal display board 5. A screen image displayed on the liquid crystal display board 5 is kept displayed until it is changed to the next screen image.

The biometric authentication device 21 first executes Steps S1 to S6. Steps S1 to S6 are the same as those in the authentication processing (FIG. 7) of the first embodiment, and descriptions thereof are omitted here.

Detecting the subject 1 in Step S6, the biometric authentication device 21 sets "1" to a count m (R1). The count m indicates the number of times preliminary shooting has been executed. The biometric authentication device 21 next determines whether or not the count m is the same as a value obtained by adding "1" to a scheduled preliminary shooting execution count M (R2). The scheduled preliminary shooting execution count M is the number of times preliminary shooting should be executed prior to actual shooting, and is set in advance. A typical value of the scheduled preliminary shooting execution count M is "3".

When the count m is the same as a value obtained by adding "1" to the scheduled preliminary shooting execution count M, the biometric authentication device 21 ends preliminary shooting and moves on to actual shooting. Then, the biometric authentication device 21 executes Steps S9 to S11. Steps S9 to S11 are the same as those in the authentication processing (FIG. 7) of the first embodiment, and descriptions thereof are omitted here. The biometric authentication device 21 thereafter ends the authentication processing.

When the count m differs from a value obtained by adding "1" to the scheduled preliminary shooting execution count M, the biometric authentication device 21 determines whether or not the count m is "1" (R3).

When the count m is "1", the biometric authentication device 21 sets the initial value $D_0$ to the liquid crystal gray scale $D_1$ of every pixel that is contained in the transmissive mask image 230 used in the first-time preliminary shooting (R10). The biometric authentication device 21 then proceeds to Step R6.

When the count m is not "1", on the other hand, the biometric authentication device 21 executes a low pass filter (LPF) algorithm on an image $P_{m-1}$, which is obtained through the preliminary shooting performed last time (R4). The biometric authentication device 21 thus obtains a back trend component $P'_{m-1}$ of an image obtained through the last preliminary shooting. The LPF algorithm is processing of removing a high frequency component that corresponds to the pattern of the blood vessels 2 from an image and extracting the back trend component $P'_{m-1}$ alone. The LPF algorithm uses a digital filter or other known technologies.

Next, the biometric authentication device 21 uses the following Mathematical Expression (8) to calculate a liquid crystal display gray scale $D_m$ for each pixel that is contained in the transmissive mask 230 used in the m-th run of preliminary shooting (R5):

$$D_m = D_{m-1} \times P'_{m-1}/P_0 \qquad (8)$$

$P_0$ is an objective value of a back trend component P' of an image obtained through actual shooting, and is set in advance.

The biometric authentication device 21 next displays on the liquid crystal display board 5 the transmissive mask image 230 used in the m-th run of preliminary shooting (R9). The liquid crystal gray scale $D_m$ calculated in Step R5 is set to each pixel contained in the displayed transmissive mask image 230 (R6). At this point, the biometric authentication device 21 turns the display LED 7 off and turns the detection LED 8 on.

The biometric authentication device 21 then executes the m-th preliminary shooting (R7), to thereby obtain an image $P_m$.

The biometric authentication device 21 subsequently adds "1" to the count m (R8) and returns to Step R2.

As described above, the biometric authentication device 21 removes a back trend component from a picked up image by displaying the transmissive mask image 230 at a liquid crystal gray scale calculated by Mathematical Expression (8).

Infrared light irradiating the subject 1 is detected after being scattered within the subject 1. The relation between the irradiating infrared light and the detected infrared light is accordingly expressed by a point spread function. In addition, this point spread function varies depending on the location of the subject 1. Therefore, even when the liquid crystal gray scale of the transmissive mask image 230 is adjusted using Mathematical Expression (8), the biometric authentication device 21 cannot remove a back trend component completely by performing preliminary shooting only once. The biometric authentication device 21 repeats preliminary shooting several times in order to improve the degree of removal of the back trend component.

After the liquid crystal gray scale of the transmissive mask image 230 is made closer to an appropriate value through repeated preliminary shooting, the biometric authentication device 21 executes actual shooting using this transmissive mask image 230. This enables the biometric authentication device 21 to match the signal level of the pattern of the blood vessels 2 to the dynamic range of the sensor board 4. The biometric authentication device 21 can therefore obtain a picked up image of high contrast-to-noise ratio and is consequently capable of executing biometric authentication with high precision.

The biometric authentication device 21 also adjusts the liquid crystal gray scale for each pixel contained in the transmissive mask image 230. The biometric authentication device 21 can thus reduce darkness unevenness in a picked up image and is consequently capable of executing biometric authentication with high precision.

The biometric authentication device 21, which is mounted to a cellular phone in the first to third embodiments, may be installed in any device or machine that includes a liquid crystal screen, such as a digital camera, an electronic organizer, a notebook computer, an automobile, and an ATM at a bank.

The invention claimed is:

1. A biometric authentication device for identifying an individual who is associated with a subject based on a biometric pattern of the subject which is included in a picked up image, comprising:
   a light guiding unit for outputting, from a surface thereof, light incident on an end face thereof;
   a liquid crystal display unit for adjusting, on a display pixel basis, an intensity of light output from the surface of the light guiding unit, and then outputting the light in a direction of the subject;
   an image pickup unit for picking up an image of the subject;
   a display light source for emitting light used as a backlight of the liquid crystal display unit such that the light is incident on the end face of the light guiding unit;
   a detection light source for emitting light for irradiating the subject such that the light is incident on the end face of the light guiding unit; and
   a control unit for controlling processing of the biometric authentication device, wherein:
   the control unit turns on the detection light when the image pickup unit picks up a first image, which is used for authentication;
   the control unit turns on the display light source when the liquid crystal display unit displays information;
   the control unit creates a mask image including a non-irradiation region, which blocks the light output from the light guiding unit, and an irradiation region, which transmits the light output from the light guiding unit, according to a placement location of the subject;
   when the image pickup unit picks up the first image, the liquid crystal display unit displays the created mask image;
   the image pickup unit picks up a fourth image when the detection light source is lit and the liquid crystal display unit displays the created mask image; and
   based on the picked up fourth image, the control unit determines a display darkness of the liquid crystal display unit in the irradiation region included in the created mask image.

2. The biometric authentication device according to claim 1, wherein the light guiding unit, the liquid crystal display unit, and the image pickup unit are overlaid in order from inside the biometric authentication device.

3. The biometric authentication device according to claim 1, wherein:
   the image pickup unit picks up a second image when both of the display light source and the detection light source are not lit;
   the image pickup unit picks up a third image when at least one of the display light source and the detection light source is lit;
   the control unit calculates a differential between the picked up second image and the picked up third image; and
   the control unit identifies the placement location of the subject based on the calculated differential.

4. The biometric authentication device according to claim 1, wherein:
   the control unit creates a plurality of the mask images according to the placement location of the subject;
   the image pickup unit picks up the first image each time the liquid crystal display unit displays one mask image out of the plurality of created mask images;
   and the control unit identifies an individual who is associated with the subject based on a plurality of the picked up first images.

5. The biometric authentication device according to claim 4, wherein non-irradiation regions included in the plurality of created mask images partially overlap with one another.

6. The biometric authentication device according to claim 1, wherein:
   the image pickup unit picks up a fifth image when the detection light source is lit;
   the control unit creates a background image by removing high frequency component information from the picked up fifth image; and
   the control unit determines a display darkness of the liquid crystal display unit on a display pixel basis in a manner that makes a pixel value of the created background image closer to a predetermined value.

7. The biometric authentication device according to claim 1, wherein the biometric pattern is a blood vessel pattern.

8. The biometric authentication device according to claim 1, wherein the display light source and the detection light source are composed of a common light source.

9. A portable terminal provided with a biometric authentication device for identifying an individual who is associated with a subject based on a biometric pattern of the subject which is included in a picked up image, comprising:
   a light guiding unit for outputting, from a surface thereof, light incident on an end face thereof;
   a liquid crystal display unit for adjusting, on a display pixel basis, an intensity of light output from the surface of the light guiding unit, and then outputting the light in a direction of the subject;
   an image pickup unit for picking up an image of the subject;
   a display light source for emitting light used as a backlight of the liquid crystal display unit such that the light is incident on the end face of the light guiding unit;
   a detection light source for emitting light for irradiating the subject such that the light is incident on the end face of the light guiding unit; and
   a control unit for controlling processing of the biometric authentication device, wherein:
   the control unit turns on the detection light when the image pickup unit picks up a first image, which is used for authentication;
   the control unit turns on the display light source when the liquid crystal display unit displays information;
   the control unit creates a mask image including a non-irradiation region, which blocks the light output from the light guiding unit, and an irradiation region, which transmits the light output from the light guiding unit, according to a placement location of the subject;
   when the image pickup unit picks up the first image, the liquid crystal display unit displays the created mask image;
   the image pickup unit picks up a fourth image when the detection light source is lit and the liquid crystal display unit displays the created mask image; and
   based on the picked up fourth image, the control unit determines a display darkness of the liquid crystal display unit in the irradiation region included in the created mask image.

* * * * *